US012567097B2

(12) United States Patent
Couig

(10) Patent No.: US 12,567,097 B2
(45) Date of Patent: Mar. 3, 2026

(54) MACHINE LEARNING PLATFORM FOR RECOMMENDING PROSPECTIVE BUYERS AND THE AUTOMATED PAIRING OF PROSPECTIVE BUYERS AND SELLERS

(71) Applicant: pocketbuyers.com LLC, Irvine, CA (US)

(72) Inventor: Stephen Couig, Irvine, CA (US)

(73) Assignee: pocketbuyers.com LLC, Irvine, CA (US)

( * ) Notice: Subject to any disclaimer, the term of this patent is extended or adjusted under 35 U.S.C. 154(b) by 275 days.

(21) Appl. No.: 18/130,645

(22) Filed: Apr. 4, 2023

(65) Prior Publication Data

US 2024/0338742 A1      Oct. 10, 2024

(51) Int. Cl.
G06Q 30/00          (2023.01)
G06Q 30/0601      (2023.01)
G06Q 50/16          (2012.01)

(52) U.S. Cl.
CPC ......... G06Q 30/0631 (2013.01); G06Q 50/16 (2013.01)

(58) Field of Classification Search
CPC ........................ G06Q 30/06–08; G06Q 50/16
See application file for complete search history.

(56) References Cited

U.S. PATENT DOCUMENTS

| 8,135,650 | B2 | 3/2012 | Walker et al. | |
| 8,433,650 | B1 | 4/2013 | Thomas | |
| 8,566,112 | B2 | 10/2013 | Klivington et al. | |
| 2013/0339189 | A1 | 12/2013 | Minerick | |
| 2016/0292763 | A1 | 10/2016 | Goodrich et al. | |
| 2018/0253780 | A1* | 9/2018 | Wang | H04L 51/02 |
| 2018/0322597 | A1 | 11/2018 | Sher | |
| 2019/0318433 | A1 | 10/2019 | Mcgee et al. | |
| 2021/0125294 | A1* | 4/2021 | Tidwell | G06Q 30/0205 |
| 2021/0390637 | A1* | 12/2021 | Kelton | G06F 16/951 |
| 2024/0029084 | A1* | 1/2024 | Douville | G06Q 30/0201 |
| 2024/0273127 | A1* | 8/2024 | Ledley | G06F 16/38 |

* cited by examiner

*Primary Examiner* — Ethan D Civan
(74) *Attorney, Agent, or Firm* — MARSHALL, GERSTEIN & BORUN LLP

(57) ABSTRACT

Methods and systems for recommending prospective buyers to sellers and/or automatically pairing prospective buyers and sellers. The methods and systems may include (1) training, by one or more processors, a machine learning model using a set of training data related to previously recommended prospective buyers; (2) receiving, by the one or more processors, a property listing (i) representative of a property possessed by and/or offered for sale by a seller and (ii) including one or more parameters of the property; (3) accessing, by the one or more processors, one or more indications of interest associated with one or more prospective buyers, the one or more indications of interest including one or more characteristics of one or more properties for potential acquisition by the one or more prospective buyers; (4) analyzing, by the one or more processors using the machine learning model, the one or more parameters of the property and the one or more indications of interest to generate, for each prospective buyer of the one or more prospective buyers, a recommendation score; and/or (5) communicating, by the one or more processors to an electronic device associated with the seller, information indicative of at least a portion of the one or more recommendation scores for the one or more prospective buyers.

20 Claims, 14 Drawing Sheets

100

400a

500

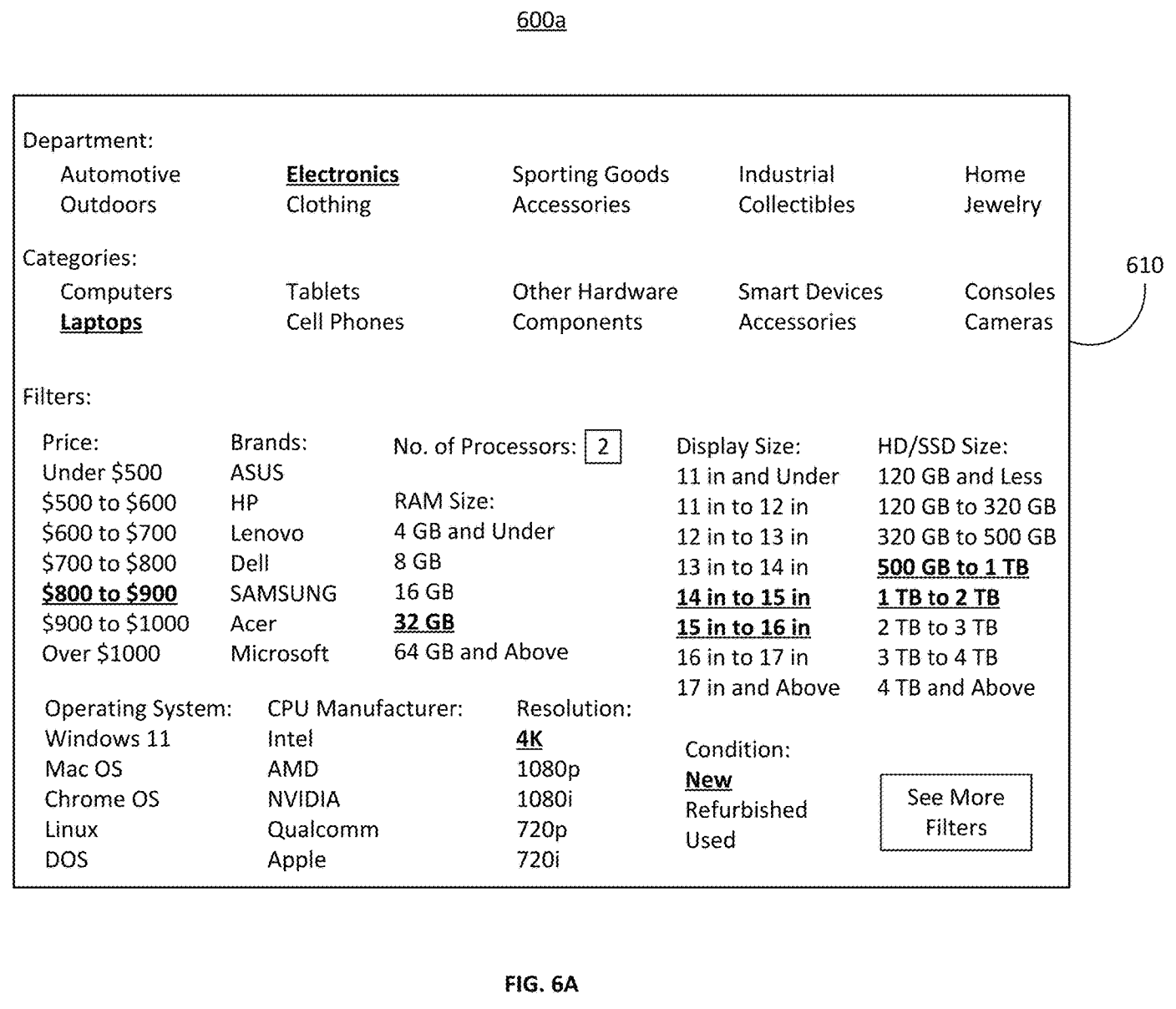

610

600a

Department:
Automotive
Outdoors
Sporting Goods
Accessories
Industrial
Collectibles
Home
Jewelry

Categories:
Computers
Laptops
Tablets
Cell Phones
Other Hardware
Components
Smart Devices
Accessories
Consoles
Cameras

Filters:

Price:
Under $500
$500 to $600
$600 to $700
$700 to $800
$800 to $900
$900 to $1000
Over $1000

Brands:
ASUS
HP
Lenovo
Dell
SAMSUNG
Acer
Microsoft

No. of Processors: [2]

RAM Size:
4 GB and Under
8 GB
16 GB
32 GB
64 GB and Above

Display Size:
11 in and Under
11 in to 12 in
12 in to 13 in
13 in to 14 in
14 in to 15 in
15 in to 16 in
16 in to 17 in
17 in and Above HD/SSD Size:
120 GB and Less
120 GB to 320 GB
320 GB to 500 GB
500 GB to 1 TB
1 TB to 2 TB
2 TB to 3 TB
3 TB to 4 TB
4 TB and Above Operating System:
Windows 11
Mac OS
Chrome OS
Linux
DOS CPU Manufacturer:
Intel
AMD
NVIDIA
Qualcomm
Apple Resolution:
4K
1080p
1080i
720p
720i Condition:
New
Refurbished
Used See More
Filters

FIG. 6A

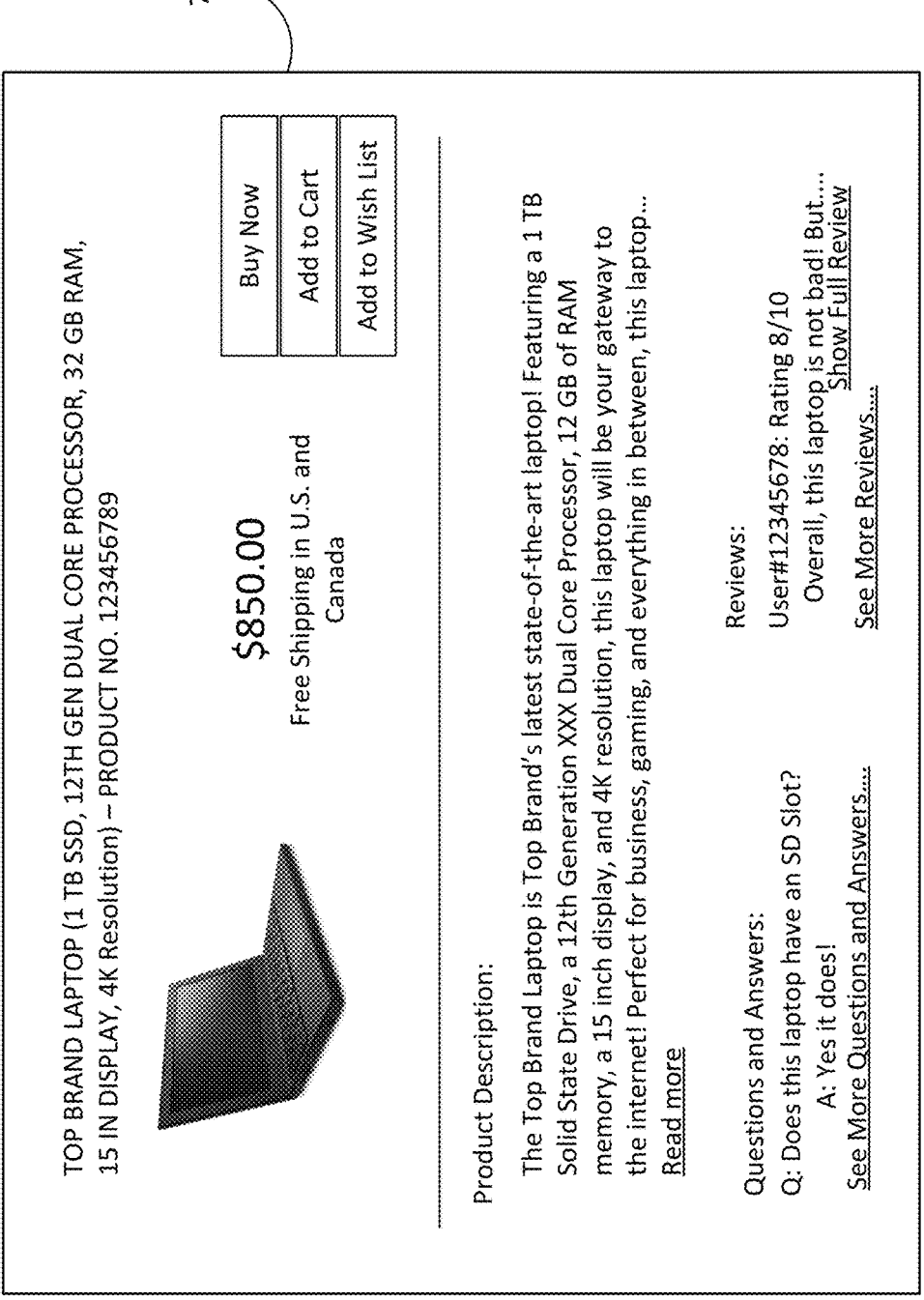

700a

710

TOP BRAND LAPTOP (1 TB SSD, 12TH GEN DUAL CORE PROCESSOR, 32 GB RAM, 15 IN DISPLAY, 4K Resolution) – PRODUCT NO. 123456789

$850.00
Free Shipping in U.S. and Canada

Buy Now

Add to Cart

Add to Wish List

Product Description:

The Top Brand Laptop is Top Brand's latest state-of-the-art laptop! Featuring a 1 TB Solid State Drive, a 12th Generation XXX Dual Core Processor, 12 GB of RAM memory, a 15 inch display, and 4K resolution, this laptop will be your gateway to the internet! Perfect for business, gaming, and everything in between, this laptop... Read more Questions and Answers:
Q: Does this laptop have an SD Slot?
　A: Yes it does!
See More Questions and Answers....

Reviews:
User#12345678: Rating 8/10
　Overall, this laptop is not bad! But....
　　　　Show Full Review
See More Reviews....

1234 Blank Ave., Apt. 1201, Chicago, IL 606XX 2 bed, 2 bath, 1300 sqft

Type: Condominium
Year Built: 2002
Central Air: Yes
Washer/Dryer: Yes
Dish Washer: Yes
Parking Garage: No
Parking Space: Yes
Balcony: Yes
HOA Fee: $450/month Description:

Spectacular, spacious, 2-bed / 2-bath condo in downtown Chicago! This modern unit has top-of-the-line kitchen/dining with an open concept living room...

Read More...

Facts and Features:     Property Tax History:     Contact Info:

Recommended
Buyers:

Matched
Buyers:

Sale History:

810

| Users: | Confidence Score: | Product No: |
|---|---|---|
| User#1112345 | 98 | 122314567 |
| User#2222345 | 88 | 222320411 |
| User#5534323 | 70 | 332314521 |
| User#5555343 | 79 | 486831524 |
| User#4443231 | 85 | 568354381 |
| User#3333221 | 74 | 686384635 |
| User#3232323 | 87 | 725438547 |
| User#6423152 | 94 | 765465421 |
| User#7535667 | 82 | 853435445 |
| User#2342163 | 89 | 955435453 |

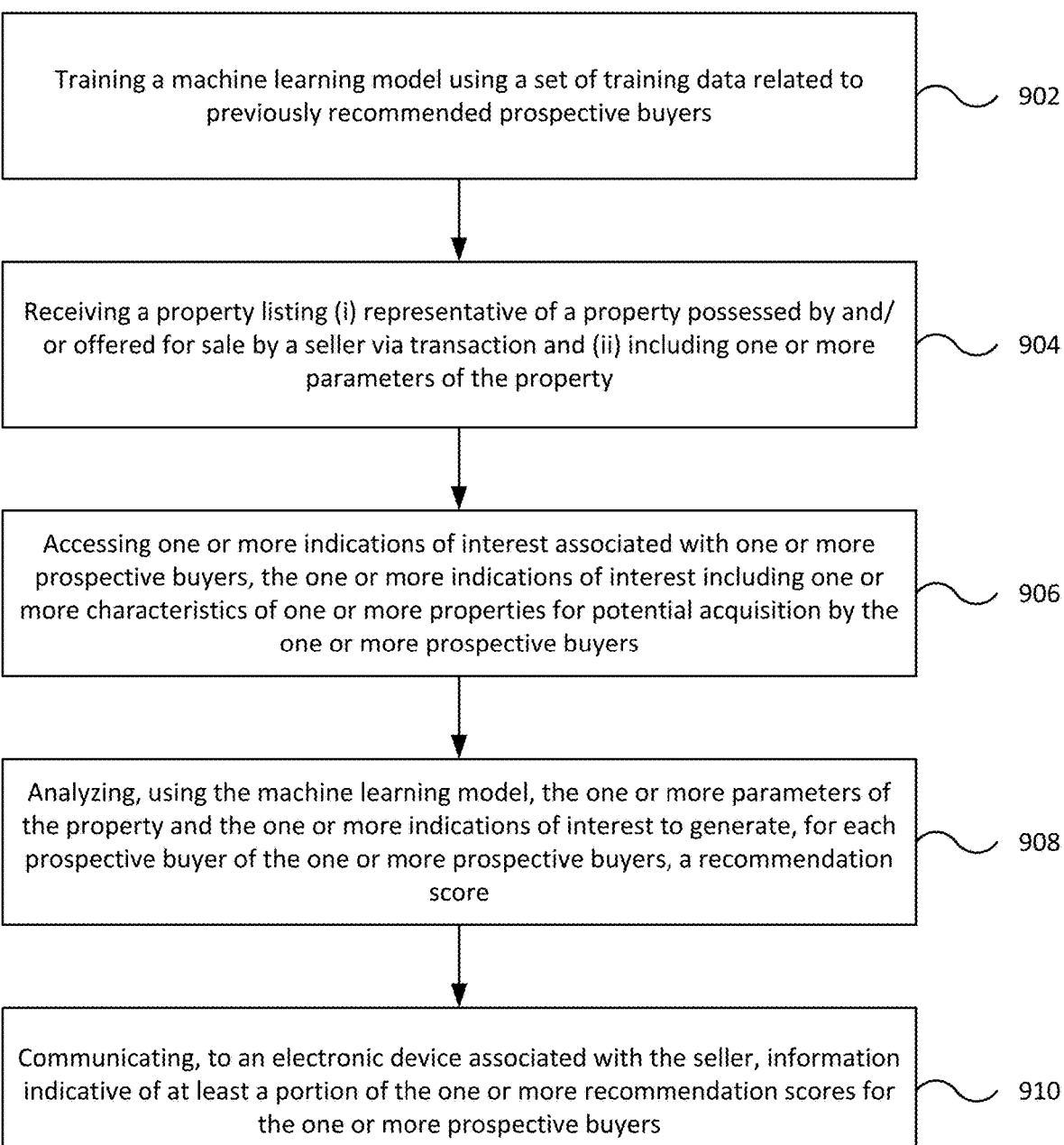

Training a machine learning model using a set of training data related to previously recommended prospective buyers — 902

Receiving a property listing (i) representative of a property possessed by and/ or offered for sale by a seller via transaction and (ii) including one or more parameters of the property — 904

Accessing one or more indications of interest associated with one or more prospective buyers, the one or more indications of interest including one or more characteristics of one or more properties for potential acquisition by the one or more prospective buyers — 906

Analyzing, using the machine learning model, the one or more parameters of the property and the one or more indications of interest to generate, for each prospective buyer of the one or more prospective buyers, a recommendation score — 908

Communicating, to an electronic device associated with the seller, information indicative of at least a portion of the one or more recommendation scores for the one or more prospective buyers — 910

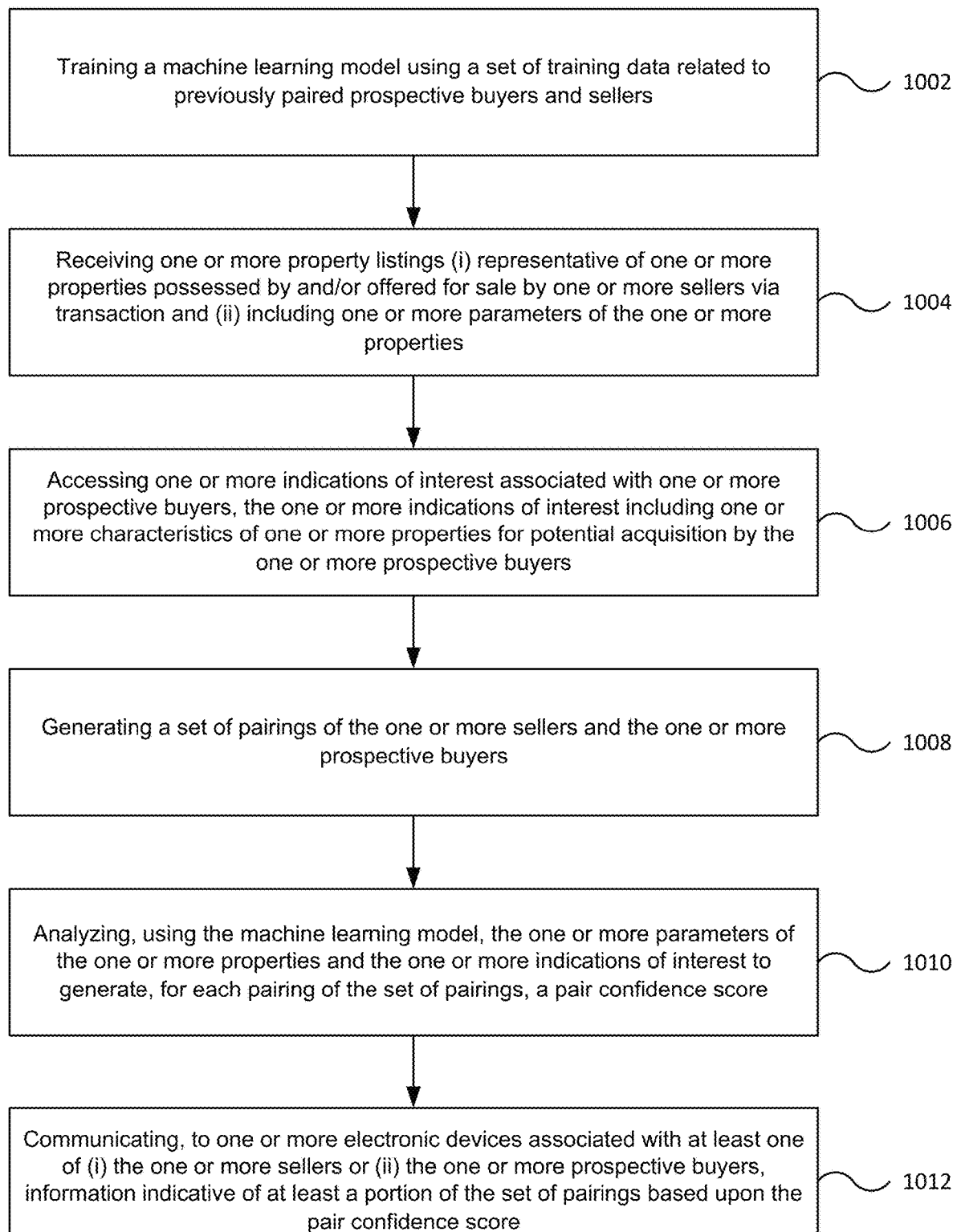

Training a machine learning model using a set of training data related to previously paired prospective buyers and sellers ⟿ 1002

Receiving one or more property listings (i) representative of one or more properties possessed by and/or offered for sale by one or more sellers via transaction and (ii) including one or more parameters of the one or more properties ⟿ 1004

Accessing one or more indications of interest associated with one or more prospective buyers, the one or more indications of interest including one or more characteristics of one or more properties for potential acquisition by the one or more prospective buyers ⟿ 1006

Generating a set of pairings of the one or more sellers and the one or more prospective buyers ⟿ 1008

Analyzing, using the machine learning model, the one or more parameters of the one or more properties and the one or more indications of interest to generate, for each pairing of the set of pairings, a pair confidence score ⟿ 1010

Communicating, to one or more electronic devices associated with at least one of (i) the one or more sellers or (ii) the one or more prospective buyers, information indicative of at least a portion of the set of pairings based upon the pair confidence score ⟿ 1012

Training a machine learning model using a set of training data related to previously determined sellers ⌇ 1102

↓

Receiving a buyer request from a prospective buyer, the buyer request (i) representative of one or more properties possessed by a potential seller, (ii) including one or more parameters of the one or more properties, and (iii) including one or more indications of interest in buying the one or more properties, the one or more indications of interest in buying the one or more properties including one or more characteristics of one or more properties for potential acquisition by the one or more prospective buyers ⌇ 1104

↓

Accessing one or more databases of one or more potential sellers, the one or more databases including (i) the one or more properties possessed by the one or more potential sellers that have one or more parameters of the buyer request and (ii) one or more indications of interest in selling the one or more properties from one or more potential sellers ⌇ 1106

↓

Analyzing, using the machine learning model, the buyer request and the one or more databases of potential sellers to determine, for each potential seller, a prediction score on the potential seller's likelihood to sell the one or more properties ⌇ 1108

↓

Determining whether the potential seller is willing to sell the one or more properties to the buyer based upon the prediction score ⌇ 1110

↓

Communicating, to an electronic device, information indicative of the determination of whether the potential seller is willing to sell the one or more properties to the buyer ⌇ 1112

FIG. 11

MACHINE LEARNING PLATFORM FOR RECOMMENDING PROSPECTIVE BUYERS AND THE AUTOMATED PAIRING OF PROSPECTIVE BUYERS AND SELLERS

TECHNICAL FIELD

The present disclosure generally relates to machine learning algorithms, techniques, platforms, methods, and systems for recommending prospective buyers of products and/or real-estate to sellers as well as the automated pairing of buyers and sellers in such markets.

BACKGROUND

In online marketplaces, there is a large emphasis on assisting prospective buyers to make a purchase. Metadata in product listings (such as search tags, descriptions, and titles), search filters, smart search engines, and recommendation algorithms are a handful of exemplary tools designed to assist prospective buyers find products to buy. For example, various real estate platforms enable prospective buyers to search for properties, view listing details, and connect with real estate professionals. The properties on these platforms are typically offered for sale, for example via the Multiple Listing Service (MLS), which is a database of properties for sale that is maintained by a local association of real estate agents and brokers.

However, existing systems do not efficiently or effectively enable sellers to find prospective buyers to sell their possessions, such as real estate or other products/items, especially if sellers have not explicitly offered those possessions for sale in a marketplace.

SUMMARY

In some embodiments, a computer-implemented method for recommending prospective buyers of properties to sellers may be provided. The method may be implemented via one or more local or remote processors, servers, memory units, mobile devices, wearables, and/or other electronic or electrical components. In one instance, the method may include: (1) training, by one or more processors, a machine learning model using a set of training data related to previously recommended prospective buyers; (2) receiving, by the one or more processors, a property listing (i) representative of a property possessed by and/or offered for sale by a seller and (ii) including one or more parameters of the property; (3) accessing, by the one or more processors, one or more indications of interest associated with one or more prospective buyers, the one or more indications of interest including one or more characteristics of one or more properties for potential acquisition by the one or more prospective buyers; (4) analyzing, by the one or more processors using the machine learning model, the one or more parameters of the property and the one or more indications of interest to generate, for each prospective buyer of the one or more prospective buyers, a recommendation score; and/or (5) communicating, by the one or more processors to an electronic device associated with the seller, information indicative of at least a portion of the one or more recommendation scores for the one or more prospective buyers. The method may include additional, less, or alternate actions, including those discussed elsewhere herein.

In other embodiments, a computer system for recommending prospective buyers of properties to sellers may be provided. The computer system may include, or be configured to work with, one or more local or remote processors, servers, memory units, mobile devices, wearables, and/or other electronic or electrical components. In one instance, the computing system may include one or more processors and associated transceivers, and a non-transitory program memory coupled to the one or more processors and storing executable instructions that, when executed by the one or more processors, cause the computer system to: (1) train a machine learning model using a set of training data related to previously recommended prospective buyers; (2) receive a property listing (i) representative of a property possessed by and/or offered for sale by a seller and (ii) including one or more parameters of the property; (3) access one or more indications of interest associated with one or more prospective buyers, the one or more indications of interest including one or more characteristics of one or more properties for potential acquisition by the one or more prospective buyers; (4) analyze, using the machine learning model, the one or more parameters of the property and the one or more indications of interest to generate, for each prospective buyer of the one or more prospective buyers, a recommendation score; and/or (5) communicate, to an electronic device associated with the seller, information indicative of at least a portion of the one or more recommendation scores for the one or more prospective buyers. The computer system may be configured to include additional, less, or alternate functionality, including that discussed elsewhere herein.

In yet other embodiments, a computer-implemented method for automated paring of sellers and prospective buyers may be provided. The method may be implemented via one or more local or remote processors, servers, memory units, mobile devices, wearables, and/or other electronic or electrical components. In one instance, the method may include: (1) training, by one or more processors, a machine learning model using a set of training data related to previously paired prospective buyers and sellers; (2) receiving, by the one or more processors, one or more property listings (i) representative of one or more properties possessed by and/or offered for sale by one or more sellers via transaction and (ii) including one or more parameters of the one or more properties; (3) accessing, by the one or more processors, one or more indications of interest associated with one or more prospective buyers, the one or more indications of interest including one or more characteristics of one or more properties for potential acquisition by the one or more prospective buyers; (4) generating, by the one or more processors, a set of pairings of the one or more sellers and the one or more prospective buyers; (5) analyzing, by the one or more processors using the machine learning model, the one or more parameters of the one or more properties and the one or more indications of interest to generate, for each pairing of the set of pairings, a pair confidence score; and/or (6) communicating, by the one or more processors to one or more electronic devices associated with at least one of (i) the one or more sellers or (ii) the one or more prospective buyers, information indicative of at least a portion of the set of pairings based upon the pair confidence score. The method may direct additional, less, or alternate functionality, including that discussed elsewhere herein.

The present disclosure may include improvements in computer functionality or in improvements to other technologies at least because the disclosure herein discloses systems and methods for automated recommendations of prospective buyers and sellers and/or the automated match making of prospective buyers and sellers. The systems and methods herein may train machine learning models using input data vectors (e.g., property listing data, prospective buyer data, seller data, indications of interest data, etc.) to generate a recommendation score of one or more prospective buyers and/or sellers as well as prediction confidence scores regarding the likelihood a seller might sell and/or a prospective buyer might buy. For example, when deployed on the underlying system, the machine learning models allow the systems and methods of the present disclosure to execute with fewer iterations, and use fewer computing resources, than prior art related systems and methods, at least because such prior art systems would require manual data entry, data storage, and/or implementation, all of which result in greater memory usage and processor utilization.

Similarly, the present disclosure describes improvements in the functioning of the computer itself or "any other technology or technical field" because the data generated (e.g., the recommendation and/or automated match making of prospective buyers and/or sellers and/or the predictive modeling of possible buyers and/or possible sellers) described herein allows the underlying computer system to utilize less processing and memory resources compared to prior art systems and methods. This is at least because the machine learning models can generate and/or determine data of a recommendation function, match-making function, and/or predictive function of potential buyers and/or sellers without the need for various tests and/or empirical computer simulation across a wide range of tests using multiple compute cycles and data. Therefore, use of the machine learning models results in fewer compute cycles, or otherwise iterations, that has less of an impact on the underlying computing device compared to previous prior art systems and methods. Said another way, the systems and methods of the present disclosure improve over the prior art at least because prior art systems and methods require an empirical or trial-and-error approach that can involve real-world trials that can result in, and require, large database and memory utilization and processor usage to arrive at a similar real-world or simulated results that has a same or similar result.

In addition, the present disclosure relates to improvement to other technologies or technical fields at least because the systems and methods of the present disclosure provide a robust, efficient, and comparable model that can be used to improve the efficiency and performance of several downstream online marketplace related tasks. This may be performed, for example, by a machine learning model that is determined or otherwise generated with based upon potential seller candidates for creating a real-estate and/or item listing that would be a best fit for a prospective buyer. The machine learning model may be deployed on an underlying computing device or system, thereby, improving its accuracy and prediction in online marketplace related tasks as described herein.

Still further, the present disclosure includes specific features other than what is well-understood, routine, conventional activity in the field, and/or otherwise adds unconventional steps that confine the disclosure to a particular useful application, e.g., systems and methods for recommending and/or pairing prospective buyers and/or sellers and/or predicting possible buyers and/or possible sellers based upon the machine learning model, which can be used, for example, for the effective and efficient output of a recommendation score, a pairing score, and/or a prediction score of one or more prospective buyers and/or sellers, which in turn may be used or applied for online marketplace related applications.

Advantages will become more apparent to those of ordinary skill in the art from the following description of the preferred embodiments, which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The FIGS. described below depict various embodiments of the systems and methods disclosed herein. It should be understood that the FIGS. depict illustrative embodiments of the disclosed systems and methods, and that the FIGS. are intended to be exemplary in nature. Further, wherever possible, the following description refers to the reference numerals included in the following FIGS., in which features depicted in multiple FIGS. are designated with consistent reference numerals.

There are shown in the drawings arrangements which are presently discussed, it being understood, however, that the present embodiments are not limited to the precise arrangements and instrumentalities shown, wherein:

FIG. 6A depicts an exemplary user interface for search filters on an online marketplace;

FIG. 7A depicts an exemplary user interface for property listings on an online marketplace;

FIG. 7B depicts an exemplary user interface for real estate listings on an online marketplace;

FIG. 8 depicts an exemplary user interface for results of the prospective buyer recommendations system;

FIG. 9 depicts an exemplary computer-implemented method for recommending a prospective buyer;

FIG. 10 depicts an exemplary computer-implemented method for pairing a prospective buyer with a seller; and The figures depict the present embodiments for purposes of illustration only. One skilled in the art will readily recognize from the following discussion that alternate embodiments of the structures and methods illustrated herein may be employed without departing from the principles of the invention described herein.

FIG. 11 depicts an exemplary computer-implemented method for determining potential sellers.

DETAILED DESCRIPTION

Figure 1:
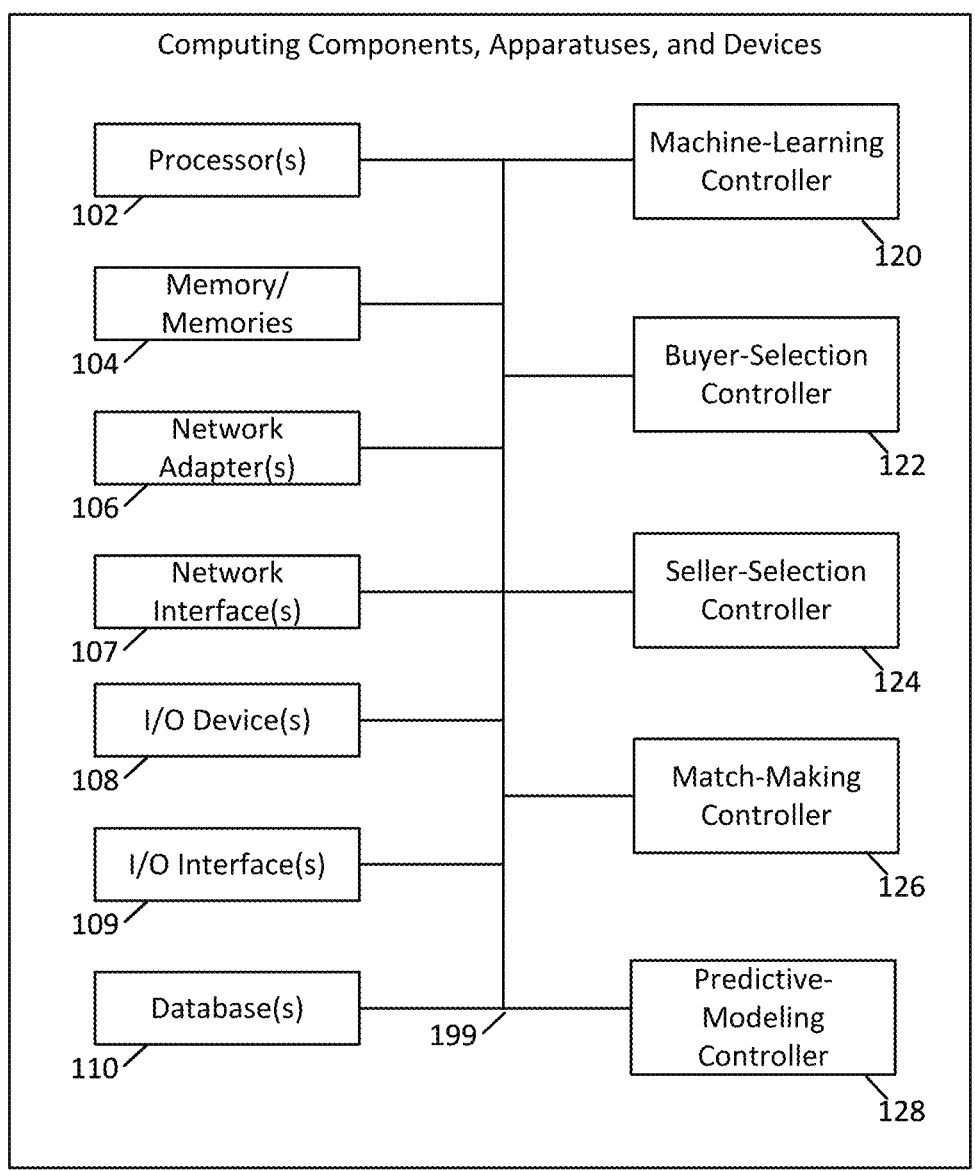
FIG. 1 depicts exemplary components, apparatuses, and devices used by devices and systems for implementing a prospective buyer recommendation system, a seller recommendation system, and/or a prospective buyer and seller pairing system.

Embodiments of the present description relate to computing systems and methods for recommending prospective buyers to sellers on online marketplaces, recommending sellers to prospective buyers on online marketplaces, and the automated pairing of prospective buyers with sellers on online marketplaces.

In some embodiments, sellers may post one or more property listings to one or more online marketplaces. Herein, "property listing" may refer to an item listing and/or a real estate listing). The property listing may feature various aspects of the item and/or real estate (e.g., title, description, search tags, item category, price, features, address, real estate type, condition, etc.). Sellers may also have a stored sale history of past transactions as well as a profile that indicates the type of item categories and/or types of real property the seller typically sells. It should also be noted that the term "property" is herein defined in the broadest possible meaning to include any and all forms of "personal property" (e.g., items, objects, and/or the like whether or not they are fungible or tangible) and any and all forms "real property" (e.g., real estates and other forms of real property rights). Further the terms "personal property" and "items" are used interchangeably herein, and the terms "real property" and "real estate" are used interchangeably herein.

In some embodiments, a prospective buyer may create a profile that features one or more indications of interests (e.g., upon creation of the profile, the prospective buyer may select from a list of options that they are interested in fine art and/or collectables and/or that they are currently in the market for real property) as well as other identifying information, contact information, and/or desired property parameters (e.g., in the case of real property, location, features, price range, square feet, number of bedrooms, etc.). Additionally, indications of interest may be updated by the prospective buyer and the application and/or website hosting the profile may ask the prospective buyer if the selected interests are up to date. Further, in some embodiments, the online marketplace(s) may store the prospective buyers' search history (e.g., search terms, search filters, property listings viewed, etc.) as well as other potential indications of interest (e.g., a voluntary entry onto a list of interest (such as a mailing list), a wish list, a list of "saved" property to be purchased later, a prior purchase history, etc.).

In some embodiments, a seller of a property listing may place a request for a prospective buyer. In these embodiments, the prospective buyer recommendation system may utilize all of the previously mentioned data (e.g., the property listing, seller data, prospective buyer data, indications of interest from the prospective buyer, etc.) to make a recommendation for a prospective buyer with a high likelihood to purchase the item and/or real property associated with the property listing. In some additional and/or alternative embodiments, a prospective buyer may place a request for a seller. In these embodiments, the seller recommendation system may utilize all of the previously mentioned data (e.g., the property listing, seller data, prospective buyer data, indications of interest from the prospective buyer, etc.) to make a recommendation for a seller that has posted a property listing that most closely matches an item and/or real estate of the prospective buyer's interest.

Further, in some yet additional and/or alternative embodiments, a prospective buyer may make a request to be automatically paired with a seller and/or a seller may make a request to be automatically paired with a prospective buyer. In these embodiments, the prospective buyer and seller pairing system may utilize all of the previously mentioned data (e.g., the property listing, seller data, prospective buyer data, indications of interest from the prospective buyer, etc.) to make a determination of the best pairing for that prospective buyer and/or seller based on the likelihood that the prospective buyer will purchase a property listing from the seller.

Exemplary Machine Learning Techniques

The present embodiments may involve, inter alia, the use of cognitive computing, predictive modeling, machine learning, and/or other modeling techniques and/or algorithms. In particular, property listings, prospective buyers' indications of interests, prospective buyers' buying history, sellers' selling history, and/or the like may be input into one or more machine learning programs described herein that are trained and/or tested to recommend a prospective buyer and/or pair a prospective buyer with a seller.

In certain embodiments, the systems, methods, and/or techniques discussed herein may use heuristic engines, algorithms, machine learning, cognitive learning, deep learning, combined learning, predictive modeling, and/or pattern recognition techniques. For instance, a processor and/or a processing element may be trained using supervised or unsupervised machine learning, and the machine learning program may employ a neural network, which may be a convolutional neural network, a deep learning neural network, and/or a combined learning module or program that learns in two or more fields or areas of interest. Machine learning may involve identifying and/or recognizing patterns in existing data in order to facilitate making predictions, estimates, and/or recommendations for subsequent data. Models may be created based upon example inputs in order to make valid and reliable predictions for novel inputs.

Additionally or alternatively, the machine learning programs may be trained and/or tested by inputting sample data sets or certain data into the programs, such as property listing data, prospective buyer data, seller data, indication of interest data, location data, date data, etc. as well as known resulting data (e.g., a set of prospective buyers who have purchased items and/or real property from sellers). The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

Exemplary Computing System

FIG. 1 depicts a block diagram of exemplary components, apparatuses, and devices 100 to recommend one or more prospective buyers, recommend one or more sellers, and/or pair a prospective buyer with a seller.

The exemplary components, apparatuses, and devices 100 may include one or more processors 102 (e.g., a programmable processor, a programmable controller, a GPU, a DSP, an ASIC, a PLD, an FPGA, an FPLD, etc.), one or more memories (e.g., random access memory (RAM), read only memory (ROM), cache, etc.) 104, one or more network adapters 106, one or more network interfaces 107, one or more I/O devices 108, one or more I/O interfaces 109, one or more databases 110, one or more machine-learning controllers 120, one or more buyer-selection controllers 122, one or more seller-selection controllers 124, one or more match-making controllers 126, and/or one or more predictive-modeling controllers 128 all of which may be interconnected via an address/data bus 199. The one or more memories 104 may store software and/or computer-executable instructions, which may be executed by the one or more processors 102.

The one or more processors 102 may be, or may include, a central processing unit (CPU), a graphical processing unit (GPU), a digital signal processor (DSP), an application specific integrated circuit (ASIC), a programmable logic device (PLD), a field-programmable gate array (FPGA), a field-programmable logic device (FPLD), etc.

The one or more memories 104 may be, or may include, any local short term memory (e.g., random access memory (RAM), read only memory (ROM), cache, etc.) and/or any long term memory (e.g., hard disk drives (HDD), solid state drives (SSD), etc.).

The one or more network adapters 106 and/or the one or more network interfaces 107 may be, or may include, a wired network adapter, connector, interface, etc. (e.g., an Ethernet network connector, an asynchronous transfer mode (ATM) network connector, a digital subscriber line (DSL) modem, a cable modem) and/or a wireless network adapter, connector, interface, etc. (e.g., a Wi-Fi connector, a Bluetooth® connector, an infrared connector, a cellular connector, etc.). The one or more network adapters 106 and/or the one or more network interfaces 107 may connect to one or more networks via one or more communication networks and/or protocols (e.g., a local area network (LAN), a wireless local area network (WLAN), a mesh network, a ZIGBEE network, a cellular network, etc.).

The one or more I/O devices 108 may be, or may include, any number of different types of peripheral devices for either inputting data or outputting results. The peripheral devices may be any desired type of device such as a keyboard, a display (a liquid crystal display (LCD), a cathode ray tube (CRT) display, touch, etc.), a navigation device (a mouse, a trackball, a capacitive touch pad, a joystick, etc.), a speaker, a microphone, a button, a communication interface, an antenna, etc. The one or more I/O interfaces 109 may include any number of different types of input and/or output units and/or combined I/O circuits and/or components that enable the one or more processors 102 to communicate with the peripheral devices.

The one or more databases 110 may be a server or some other form of data storage device (e.g., one or more memories 104, CDs, CD-ROMs, DVDs, Blu-ray disks, etc.). In some examples, the one or more databases 110 store one or more sets of training/testing data.

The one or more machine-learning controllers 120, the one or more buyer-selection controllers 122, the one or more seller-selection controllers 124, the one or more match-making controllers 126, and/or the one or more predictive-modeling controllers 128 may be, or may include, computer-readable, executable instructions that may be stored in the one or more memories 104 and/or performed by the one or more processors 102. Further, the computer-readable, executable instructions of the one or more machine-learning controllers 120, the one or more buyer-selection controllers 122, the one or more seller-selection controllers 124, the one or more match-making controllers 126, and/or the one or more predictive-modeling controllers 128 may be stored on and/or performed by specifically designated hardware (e.g., micro controllers, microchips, etc.) which may have functionalities similar to the one or more memories 104 and/or the one or more processors 102.

Exemplary Machine Learning Environments

Figure 2:
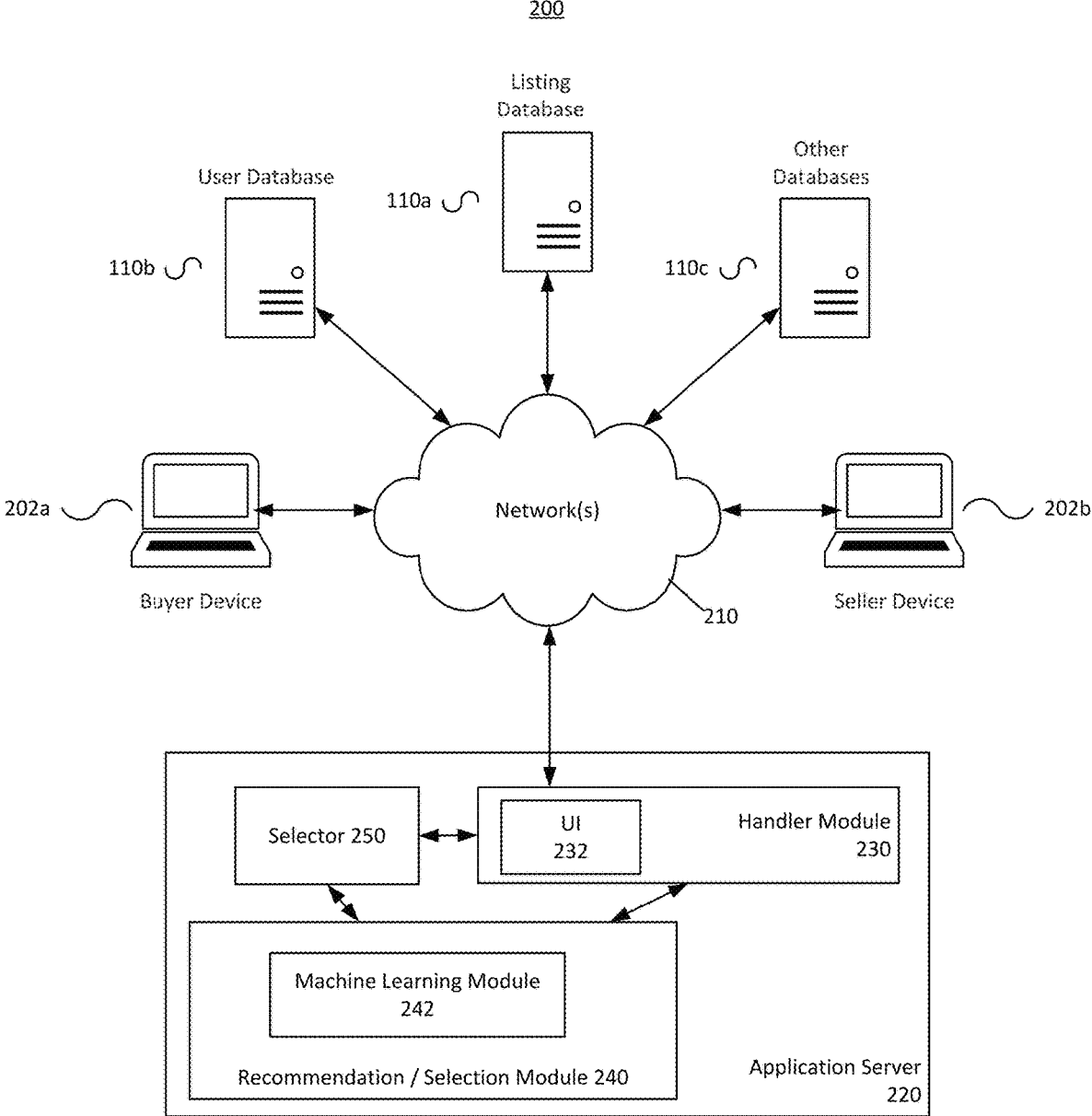
FIG. 2 depicts an exemplary computing environment including components, apparatuses, and devices for implementing the prospective buyer recommendation system, the seller recommendation system, and/or the prospective buyer and seller pairing system.

FIG. 2 depicts a diagram of an exemplary computing environment 200. The computing environment 200 may include a buyer device 202a, a seller device 202b, one or more listing databases 110a, one or more user databases 110b, one or more networks 210, an application server 220, a handler module 230, a user interface (UI) 232, a recommendation/selection module 240, a machine learning module 242, and/or a selector 250.

The user device 202 may be, or may include, a computing device such as a laptop computer, a tablet, a smartphone, a desktop device, a wearable device, mobile device, smart contacts, smart glasses, augmented reality glasses, virtual reality headset, etc. The one or more listing databases 110a and/or one or more user databases 110b may be, or may include, one or more databases, servers, data repositories, etc. (e.g., the one or more databases 110). The one or more networks 210 may be, or may include, the internet, a local area network (LAN), a metropolitan area network (MAN), a wide area network (WAN), a wired network, a Wi-Fi network, a cellular network, a wireless network, a private network, a virtual private network, etc.

The application server 220 may include the handler module 230, the recommendation/selection module 240, and/or the selector 250. The handler module 230 may include UI 232. The recommendation/selection module 240 may include a machine learning module 242. The application server 220, the handler module 230, the UI 232, the recommendation/selection module 240, the machine learning module 242, and/or the selector 250, may be, or may include, a portion of a memory unit (e.g., the one or more memories 104 of FIG. 1) configured to store software and/or computer-executable instructions that, when executed by a processing unit (e.g., the one or more processors 102 of FIG. 1), may cause the one or more of the aforementioned components to recommend one or more prospective buyers, recommend one or more sellers, and/or pair a prospective buyer with a seller.

In operation, the application server 220 may connect to the buyer device 202a, the seller device 202b and/or one or more databases, servers, and/or other data repositories (e.g., the one or more listing databases 110a, the one or more user databases 110b, etc.) via one or more networks 210. In some embodiments, the connection may include the prospective buyer and/or the seller signing into an account stored with the application server 220. In some embodiments, the connection may include navigating to a website and/or a web application hosted by the application server 220. In some embodiments, the connection may include a client device (e.g., the buyer device 202a and/or the seller device 202b) establishing a client-host connection to the application server 220. In these embodiments, client device may establish the client-host connection via an application run on the client device. In some embodiments, the connection may be through either a third party connection (e.g., an email server) or a direct peer-to-peer (P2P) connection/transmission.

The handler module 230 may receive an initial request for a prospective buyer recommendation, a seller recommendation, and/or a pairing of a prospective buyer with a seller from either a prospective buyer or a seller and/or one or more sets of input data over the one or more networks 210. The handler module 230 may forward the one or more sets of input data to the recommendation/selection module 240. The recommendation/selection module 240 may pass the one or more sets of input data through the machine learning module 242, which may generate one or more recommended prospective buyers, one or more recommended sellers, and/or one or more pairings of prospective buyers and sellers. The one or more recommended prospective buyers may be returned to the handler module 230 which may in turn present the one or more recommended prospective buyers to a seller via the seller device 202b. Similarly, the one or more recommended sellers may be returned to the handler module 230 which may in turn present the one or more recommended sellers to a prospective buyer via the prospective buyer device 202a. Further, the one or more pairings of prospective buyers and sellers may be returned to the handler module 230 which may in turn present the one or more pairings of prospective buyers and sellers to the prospective buyers and/or sellers via the buyer device 202a and/or the seller device 202b.

In some embodiments, the handler module 230 may implement an interactive UI 232 (e.g., a web-based interface, mobile application, etc.) that may be used by the prospective buyer and/or seller to submit requests to receive prospective buyer recommendations, receive seller recommendations, and/or receive pairings between prospective buyers and sellers via the prospective buyer device 202a and/or the seller device 202b.

The machine learning module 242 may generate a machine learning model based upon training data from previously recommended prospective buyers, previously recommended sellers, and/or previous buyers who actually purchased from previous sellers. The training data may include, for each previously recommended prospective buyer and/or seller and/or for each pairing of prospective buyers and sellers, a set of characteristics of the previously recommended prospective buyers and/or sellers and/or paired prospective buyers and sellers as well as buyers who actually purchased from previous sellers. The set of characteristics may include classifications, categories, fields, entries, parameters, values, interconnected data, etc. related to and/or derived from prior input data.

The machine learning module 242 may classify the data for each previously recommended prospective buyers and/or sellers and/or pairings of prospective buyers and sellers into one of several subsets of training data, where each subset corresponds to a different set of characteristics. For example, some subsets may be derived based upon a prospective buyer's search history while some other subsets may be derived based upon the prospective buyers' selected categories of interest, and yet other subsets may be derived based upon property listings available, and so on. The machine learning module 242 may analyze each of the subsets to generate the machine learning model for recommending a prospective buyer, recommending a seller, and/or pairing a prospective buyer with a seller using one or more machine learning techniques. In some aspects, other types of machine learning techniques may be adapted to solve some aspects of the presently described techniques, such as gradient boosting, neural networks, deep learning, linear regression, polynomial regression, logistic regression, support vector machines, decision trees, random forests, nearest neighbors, and/or any other suitable machine learning technique.

For example, when the machine learning technique is decision trees, the machine learning module 242 may collect several representative samples of each of the subsets of the training data. Using each representative sample, the machine learning module 242 may generate a decision tree for recommending a prospective buyer, recommending a seller, and/or pairing a prospective buyer with a seller. The machine learning module 242 may aggregate and/or combine each of the decision trees (e.g., by averaging the number of actual purchases made after recommendations are determined at each individual tree, calculating a weighted average, taking a majority vote, etc.) to generate the machine learning model. Each decision tree may include several nodes, branches, and leaves, where each node of the decision tree represents a test on a characteristic (e.g., whether the probability a prospective buyer would purchase property from a seller is greater than a threshold amount). Each branch represents the outcome of the test. Moreover, each leaf represents a different potential recommended prospective buyer/seller candidate and confidence score attached to that potential recommended prospective buyer/seller candidate. Each decision tree may include any number of nodes, branches, and leaves, having any suitable number and/or types of tests on characteristics and/or statistical measures.

As another example, when the machine learning technique is linear regression analysis, the previous buyers who actually purchased from previous sellers may be dependent variables and each of the characteristics may be independent variables. The machine learning module 242 may generate a machine learning model as an equation which most closely approximates the previous buyers who actually purchased from previous sellers from the characteristics.

In some embodiments, an ordinary least squares method may be used to minimize the difference between the value of the guessed recommended prospective buyers and/or sellers and/or paired prospective buyers and sellers and the prospective buyers that actually purchased property from the sellers. Additionally, the differences between the values of each recommended prospective buyers, recommended sellers, and/or paired prospective buyers and sellers ($\hat{y}_i$) using the machine learning model and previous prospective buyers who actually purchased from previous sellers ($y_i$) may be aggregated and/or combined in any suitable manner to determine a mean square error (MSE) of the regression. The MSE may be used to determine a standard error or standard deviation ($\sigma_\varepsilon$) in the machine learning model, which may in turn be used to create confidence intervals. For example, assuming the data is normally distributed, a confidence interval which may include about three standard deviations from the recommended prospective buyer/seller using the machine learning model ($\hat{y}_i - 3\sigma_\varepsilon - \hat{y}_i + 3\sigma_\varepsilon$) may correspond to 99.5 percent confidence. A confidence interval which may include about two standard deviations from the recommended prospective buyer/seller using the machine learning model ($\hat{y}_i - 2\sigma_\varepsilon - \hat{y}_i + 2\sigma_\varepsilon$) may correspond to 95 percent confidence. Moreover, a confidence interval which may include about 1.5 standard deviations from the recommended prospective buyer/seller using the machine learning model ($\hat{y}_i - 1.5\sigma_\varepsilon - \hat{y}_i + 1.5\sigma_\varepsilon$) may correspond to 90 percent confidence.

The machine learning module 242 may test the machine learning model generated. In some embodiments, the test may be conducted using the machine learning technique used to generate the model (e.g., gradient boosting, neural networks, deep learning, linear regression, polynomial regression, support vector machines, decision trees, random forests, nearest neighbors, or any other suitable machine learning technique). Further, in some embodiments, the testing data may be from the same collection of data as the training data. In these embodiments, the training data is divided into a ratio of training data and testing data (e.g., 20% training data and 80% testing data). The training data generates the machine learning model and the testing data determines the accuracy of the model. When the machine learning module 242 is correct more than a predetermined threshold amount, the machine learning model may be used for recommending prospective buyers, recommending sellers and/or pairing prospective buyers with sellers. However, if the machine learning module 242 is not correct more than the threshold amount, the machine learning module 242 may continue obtaining sets of training data and/or testing data for further training and/or testing.

Once the prospective buyer recommendation, seller recommendation, and/or the pairing of the prospective buyer and seller has been made, the recommendation/selection module 240 may return the results to the handler module 230. The handler module 230 may pass the results to the prospective buyer device 202a and/or the seller device 202b via the one or more networks 210.

In some embodiments, more than one prospective buyer and/or seller may be selected. In these embodiments, a scoring system may be utilized to rate each of the potential prospective buyers and/or sellers. As such, the resulting list of recommended prospective buyers and/or recommended sellers from the recommendation/selection module 240 may be ranked by a selector 250. The selector 250 may sort the list of recommended prospective buyers and/or recommended sellers by their score in addition to removing prospective buyers and/or sellers from the list if their score does not exceed and/or meet a threshold amount. In these embodiments, this scored list of recommended prospective buyers and/or recommended sellers may be passed to the handle module 230 and subsequently presented to the prospective buyers and/or sellers. In some additional and/or alternative embodiments, the scored list of recommended prospective buyers and/or recommended sellers may be used to pair prospective buyers with sellers. In these embodiments, the scores of the prospective buyers, the scores of the sellers, and/or the relative scores of the prospective buyers/sellers may be used in determining the best pairing of prospective buyers and sellers. The resulting pairs of prospective buyers and sellers may be passed to the handle module 230 and subsequently presented to the prospective buyers and/or sellers.

It should be appreciated that while specific elements, processes, devices, and/or components are described as part of the application server 220, other elements, processes, devices and/or components are contemplated.

Exemplary Input Vectors

An example input vector may include input data such as a property listing data set (e.g., a property listing title, a property listing price, a property listing categorization, a property listing description, etc.), a prospective buyer data set (e.g., a prospective buyer identifier, a prospective buyer indication of category interest, a prospective buyer wish list, a prospective buyer saved for later list, a prospective buyer purchase history, a prospective buyer indication of intent to purchase, etc.), a seller data set (e.g., a seller identifier, an indication of categories the seller posts property listings, property listings posted by the seller, sale history of the seller, etc.), an indication of interest data set (e.g., a selected and or viewed category by a prospective buyer, a selected or viewed property listing by a prospective buyer, a selected or viewed browsing history consisting of search tags, search terms, search filters, and the like by a prospective buyer, an entry onto a list of interested prospective buyers (such as a mailing list) by a prospective buyer, a probability score of a prospective buyer to purchase a type of property, etc.), a location data set (e.g., a geolocation, an address, a zip code, etc.), a date data set (e.g., time, a day, a date, a year, a month, a season, etc.), and/or other data (e.g., list of categories, price ranges, determinations of related items and/or real estates, etc.). Any of the foregoing example input data may be submitted by a user as user entered data, determined by the computing system 100 and/or the computing environment 200 as determined data, and/or pulled by the computing system 100 and/or the computing environment 200 from one or more databases, servers, and/or other data repositories (e.g., the one or more listing databases 110a, the one or more user databases 110b, etc.) over one or more networks as pulled data.

The user entered data may be generated by either a prospective buyer (e.g., a buyer profile) or a seller (e.g., property listings). Additionally or alternatively, the user entered data may be included with a request for a prospective buyer and/or seller recommendation. In some embodiments, the prospective buyer and/or seller may submit the recommendation request and/or the user entered data by a client device (e.g., a prospective buyer device 202a or a seller device 202b) connected to the application server 220 via the one or more networks 210. The recommendation request and/or the user entered data may be generated and/or submitted to the application server 220 via a website, a web application, a user device 202 application, an electronic communication (e.g., email, electronically transmitted documents, etc.), and/or the like.

The computing system 100 and/or the computing environment 200 may determine any of the aforementioned data and/or any other data based upon preexisting data. For example, the computing system 100 and/or the computing environment 200 may generate a probability score of a prospective buyer to purchase a type of property based upon other data (e.g., indication of interest data and/or prospective buyer data).

The computing system 100 and/or the computing environment 200 may pull any of the aforementioned data and/or any other data from one or more databases and/or other data repositories stored across one or more networks 210.

Any of the foregoing input data may include one or more fields, labels, entries, parameters, and/or values in addition to, interchanged with, and/or instead of those listed.

Exemplary Machine Learning Training Module & Scoring Module

Figure 3:
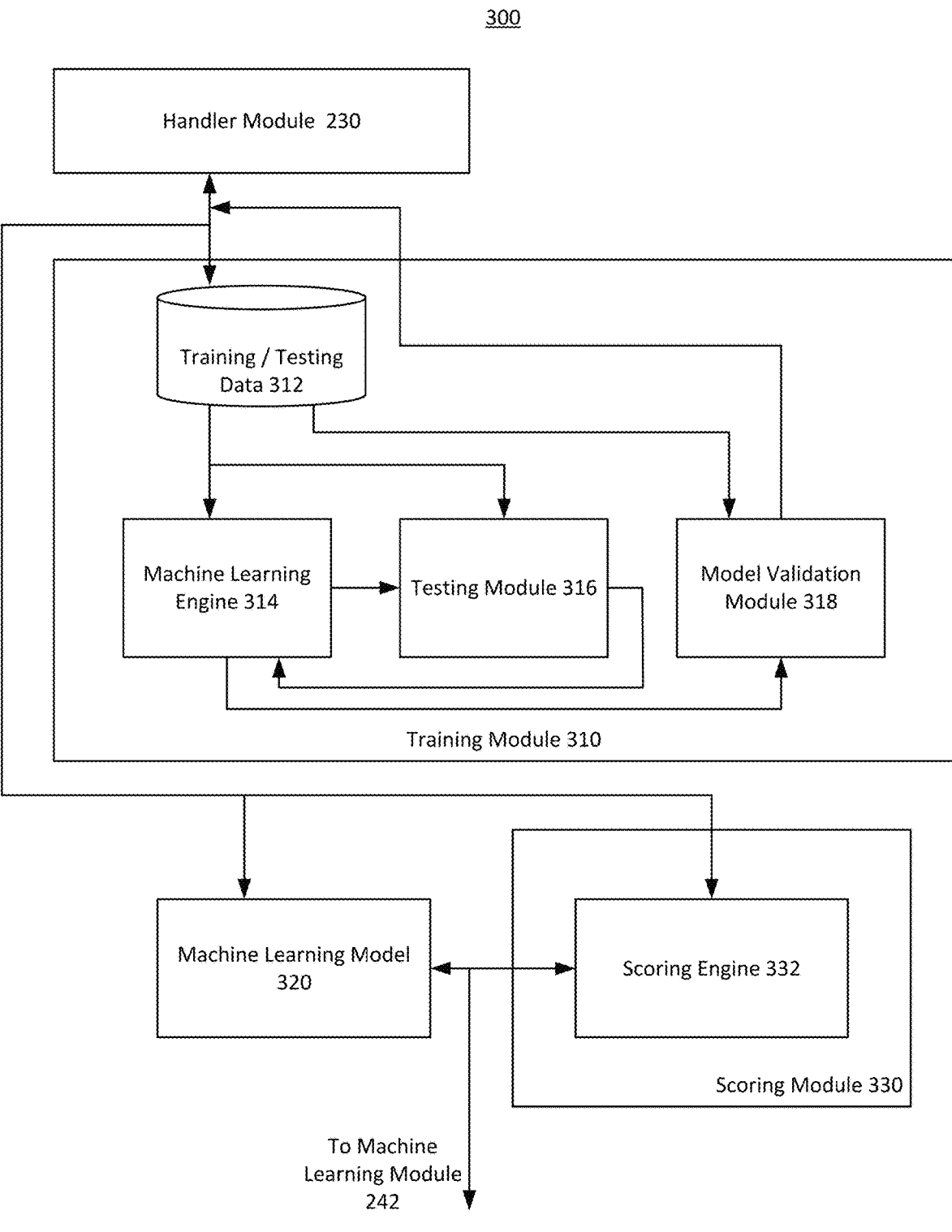
FIG. 3 depicts an exemplary computing system for machine learning training modules.

FIG. 3 depicts a diagram of an exemplary machine learning training module 300. The machine learning training module 300 may include a training module 310, training/testing data 312, a machine learning engine 314, a testing module 316, a model validation module 318, a machine learning model 320, a scoring module 330, and/or a scoring engine 332.

The training module 310 may include the machine learning engine 314, the testing module 316, and/or the model validation module 318. The training/testing data 312 may store prior requests for prospective buyer and/or seller recommendations, prior requests for pairings of prospective buyers and sellers, prior prospective buyer and/or seller recommendations, prior pairings of prospective buyers and sellers, and/or previous prospective buyers who actually purchased from previous sellers which may be stored on any number or type(s) of non-transitory machine-readable storage medium or disk using any number or type(s) of data structures. The scoring module 330 may include the scoring engine 332.

The training module 310, the machine learning engine 314, the testing module, 316, the model validation module 318, the machine learning model 320, the scoring module 330, and/or the scoring engine 332, may be, or may include, a portion of a memory unit (e.g., the one or more memories 104 of FIG. 1) configured to store software and/or computer-executable instructions that, when executed by a processing unit (e.g., the one or more processors 102 of FIG. 1), may cause the one or more of the aforementioned components to generate, develop, train, test, deploy, and/or validate the machine learning model 320 for recommending one or more prospective buyers, recommending one or more sellers and/or pairing prospective buyers and sellers. The training module 310, the machine learning model 320 and/or the scoring module 330 may be executed for use as the machine learning module 242 of FIG. 2. There may be one or more machine learning models 320.

In operation, the handler module 230 may initially access the machine learning training module 300. The machine learning training module 300 may form input vectors from the training/testing data 312 and may be passed through the machine learning engine 314 to form test prospective buyer recommendations, seller recommendations, and/or paired prospective buyers and sellers. Similarly, the machine learning training module 300 may pass prior requests for prospective buyer and/or seller recommendations, prior requests for pairings of prospective buyers and sellers, prior prospective buyer and/or seller recommendations, prior pairings of prospective buyers and sellers, and/or previous prospective buyers who actually purchased from previous sellers to the testing module 316 and/or to the model validation module 318. The developing machine learning model within the machine learning engine 314 may be trained using supervised learning.

The testing module 316 may compare the resulting prospective buyer recommendations, seller recommendations, and/or paired prospective buyers and sellers determined by the machine learning engine 314 to the previous buyers who actually purchased from previous sellers to determine an error rate that may be used to develop and/or update the machine learning model 320. The machine learning engine 314 may generate, develop, deploy, and/or update the machine learning model 320 by using, for example, gradient boosting machine learning, a neural network, deep learning, a regression technique, etc.

The developing machine learning model within the machine learning engine 314 may be validated by the model validation module 318. The model validation module may statistically validate the developing machine learning model, for example, by using k-fold cross-validation. In these embodiments, the training/testing data 312 may be randomly split into k parts, and the developing machine learning model may be trained using k–1 of the k parts of the training/testing data 312 which represent prior requests for prospective buyer and/or seller recommendations, prior requests for pairings of prospective buyers and sellers, prior prospective buyer and/or seller recommendations, prior pairings of prospective buyers and sellers, and/or previous prospective buyers who actually purchased from previous sellers.

The developing machine learning model may be evaluated using the remaining one part of the training/testing data 312 which represent the prior requests for prospective buyer and/or seller recommendations, prior requests for pairings of prospective buyers and sellers, prior prospective buyer and/or seller recommendations, prior pairings of prospective buyers and sellers, and/or previous prospective buyers who actually purchased from previous sellers, which the machine learning engine 314 has not yet been exposed to. Results of the developing machine learning model for prospective buyer recommendations, seller recommendations, and/or paired prospective buyers and sellers are compared to the previous buyers who actually purchased from previous sellers by the model validation module 318 to determine the performance and/or convergence of developing machine learning model. Performance and/or convergence may be determined by, for example, identifying when a metric computed over the previously determined error rate (e.g., a mean-square metric, a rate-of-decrease metric, etc.) satisfies a criteria (e.g., a metric is less than a predetermined threshold, such as a root mean squared error).

The resulting machine learning model 320 may be further evaluated by the scoring module 330. The scoring engine 332 of the scoring module 330 may be used to generate simulated input data from sample data from the training/testing data 312. The simulated input data may include simulated prospective buyer and/or seller recommendations, a designation on whether the simulated prospective buyer purchased from a simulated seller, etc.

In some alternative embodiments, the scoring module 330 may develop, deploy, and/or update the machine learning model 320 without the training module 310. In these embodiments, the scoring module 330 uses sample data from the training/testing data 312 to generate a plurality of simulated input data. The input data may be used as the training data and/or the testing data in the development of the machine learning model 320.

The foregoing processes may repeat until the results of the machine learning model 320 produce a desirable error rate. The machine learning model 320 may be updated from parallel machine learning engines 314 and/or scoring engines 332. It should be appreciated that while specific elements, processes, devices, and/or components are described as part of example machine learning training module 300, other elements, processes, devices and/or components are contemplated and/or the elements, processes, devices, and/or components may interact in different ways and/or in differing orders, etc.

Exemplary Implementation of the Prospective Buyer/Seller Recommendation System

Figure 4A:
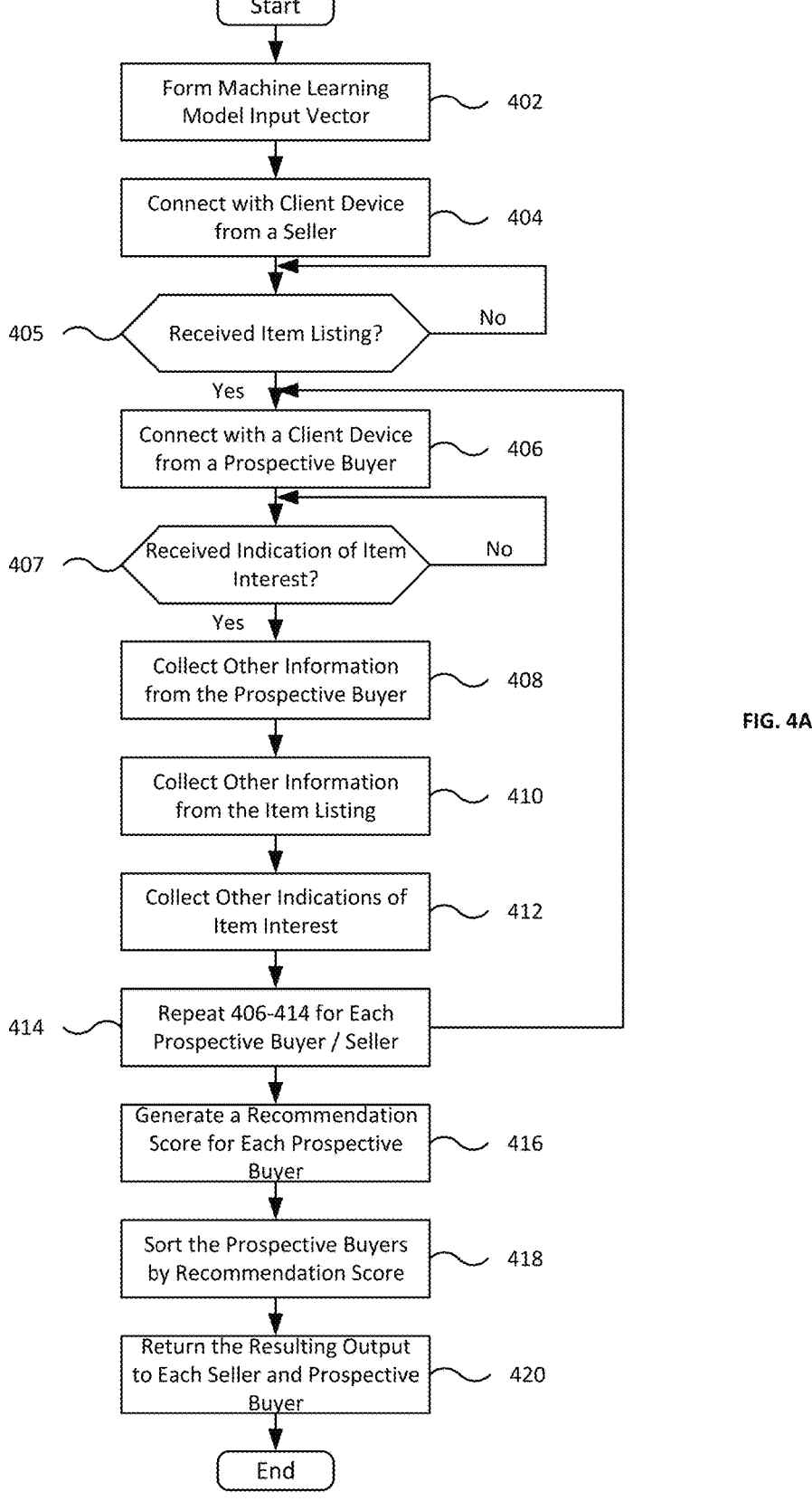
FIG. 4A depicts an exemplary flowchart representative of example methods, hardware logic, and instructions for implementing the prospective buyer recommendation system and/or the seller recommendation system.

FIG. 4A depicts an exemplary computer-based method 400*a* for implementing prospective buyer and/or seller recommendations. In some aspects, the method 400*a* may correspond to, and/or be implemented by, the application server 220 of FIG. 2.

The processes, methods, software, and/or computer-executable instructions included within the method 400*a* may be, or may include, an executable program or portion of an executable program for execution by a processor such as the one or more processors 102 of FIG. 1. The program may be embodied in software or instructions stored on a non-transitory computer-readable storage medium or disk associated with the one or more processor 102. Further, although the example program is described with reference to the flowchart illustrated in FIG. 4A, many other methods of implementing the application server 220 may alternatively be used. For example, the order of execution of the blocks may be changed, and/or some of the blocks described may be changed, eliminated, or combined.

Additionally, or alternatively, any or all of the blocks may be implemented by one or more hardware circuits (e.g., discrete and/or integrated analog and/or digital circuitry, an application specific integrated circuit (ASIC), a programmable logic device (PLD), a field programmable gate array (FPGA), a field programmable logic device (FPLD), a logic circuit, etc.) structured to perform the corresponding operation without executing software or firmware.

The method 400a of FIG. 4A may begin by using one or more sets of input data (e.g., property listing data, prospective buyer data, seller data, indication of interest data, location data, date data, and/or other data) to form an input vector (block 402). A prospective buyer recommendation system and/or a seller recommendation system (e.g., application server 220) may use the input vector to develop a machine learning model to recommend one or more prospective buyers and/or sellers via a machine learning training module 300.

The prospective buyer recommendation system and/or the seller recommendation system may connect to a first client device from a seller (e.g., a seller device 202b) (block 404) via a website, a web application, a client device application, and/or the like over a network (e.g., the one or more networks 210). The prospective buyer recommendation system and/or the seller recommendation system may wait until the prospective buyer recommendation system and/or the seller recommendation system receives a property listing from the seller. The property listing may contain one or more data entries filled by the seller and transmitted by the first client device to the prospective buyer recommendation system and/or the seller recommendation system over the network.

If the prospective buyer recommendation system and/or the seller recommendation system has not received the property listing (block 405), the method 400a may return back to the start of block 405 until it receives a property listing. If the prospective buyer recommendation system and/or the seller recommendation system has received a property listing (block 405), the prospective buyer recommendation system and/or the seller recommendation system may connect to a second client device from a prospective buyer (e.g., a prospective buyer device 202a) (block 406) via a website, a web application, a client device application, and/or the like over the network. The prospective buyer recommendation system and/or the seller recommendation system may wait until the prospective buyer recommendation system and/or the seller recommendation system receives an indication of interest from the prospective buyer. The indication of interest may be (i) a selected and or viewed property category by a prospective buyer, (ii) a selected or viewed property listing by a prospective buyer, (iii) a selected or viewed browsing history consisting of search tags, search terms, search filters, and the like by a prospective buyer, (iv) an entry onto a list of interested prospective buyers (such as a mailing list) by a prospective buyer, (v) a probability score of a prospective buyer to purchase a type of property, (vi) prospective buyer data (e.g., a prospective buyer indication of category interest, a prospective buyer wish list, a prospective buyer saved property list, a prospective buyer purchase history, a prospective buyer indication of intent to purchase), and/or the like and transmitted by the second client device to the prospective buyer recommendation system and/or the seller recommendation system over the network.

If the prospective buyer recommendation system and/or the seller recommendation system has not received the indication of interest (block 407), the method 400a may return back to the start of block 407 until it receives an indication of interest. If the prospective buyer recommendation system and/or the seller recommendation system has received an indication of interest (block 407), the prospective buyer recommendation system and/or the seller recommendation system may receive other information from the prospective buyer (e.g., the prospective buyer's purchase history, prior indications of categories of interest, search history, etc.) (block 408), other information from the property listing (e.g., title, search tags, description, property category, etc.) (block 410), and/or other indications of interest from the prospective buyer (block 412). The prospective buyer recommendation system and/or the seller recommendation system may repeat blocks 406-412 for each prospective buyer and/or seller (block 414).

The prospective buyer recommendation system and/or the seller recommendation system may pass the data gathered through the fully developed machine learning model (e.g., the machine learning model 320) to generate a recommendation score for each prospective buyer and/or seller in a list of recommendations (block 416). The prospective buyer recommendation system and/or the seller recommendation system may sort the list of recommendations by recommendation score based upon a "best fit" model (e.g., the prospective buyers with a higher rank may have a higher likelihood of purchasing property from a property listing and/or the seller with a higher rank may have a higher likelihood of having a property listing a prospective buyer is wanting to buy) (block 418). The prospective buyer recommendation system and/or the seller recommendation system may present the resulting list to the seller and/or prospective buyer via the first client device or second client device, respectfully (block 420). In the embodiments where only a single prospective buyer and/or a single seller is recommended, the prospective buyer recommendation system and/or the seller recommendation system may also rank the prospective buyer and/or seller candidates according to the "best fit" model, but the prospective buyer recommendation system and/or the seller recommendation system may only select and/or present the prospective buyer and/or the seller that ranks the highest. The method 400a may exit.

Exemplary Implementation of the Prospective Buyer and Seller Pairing System

Figure 4B:
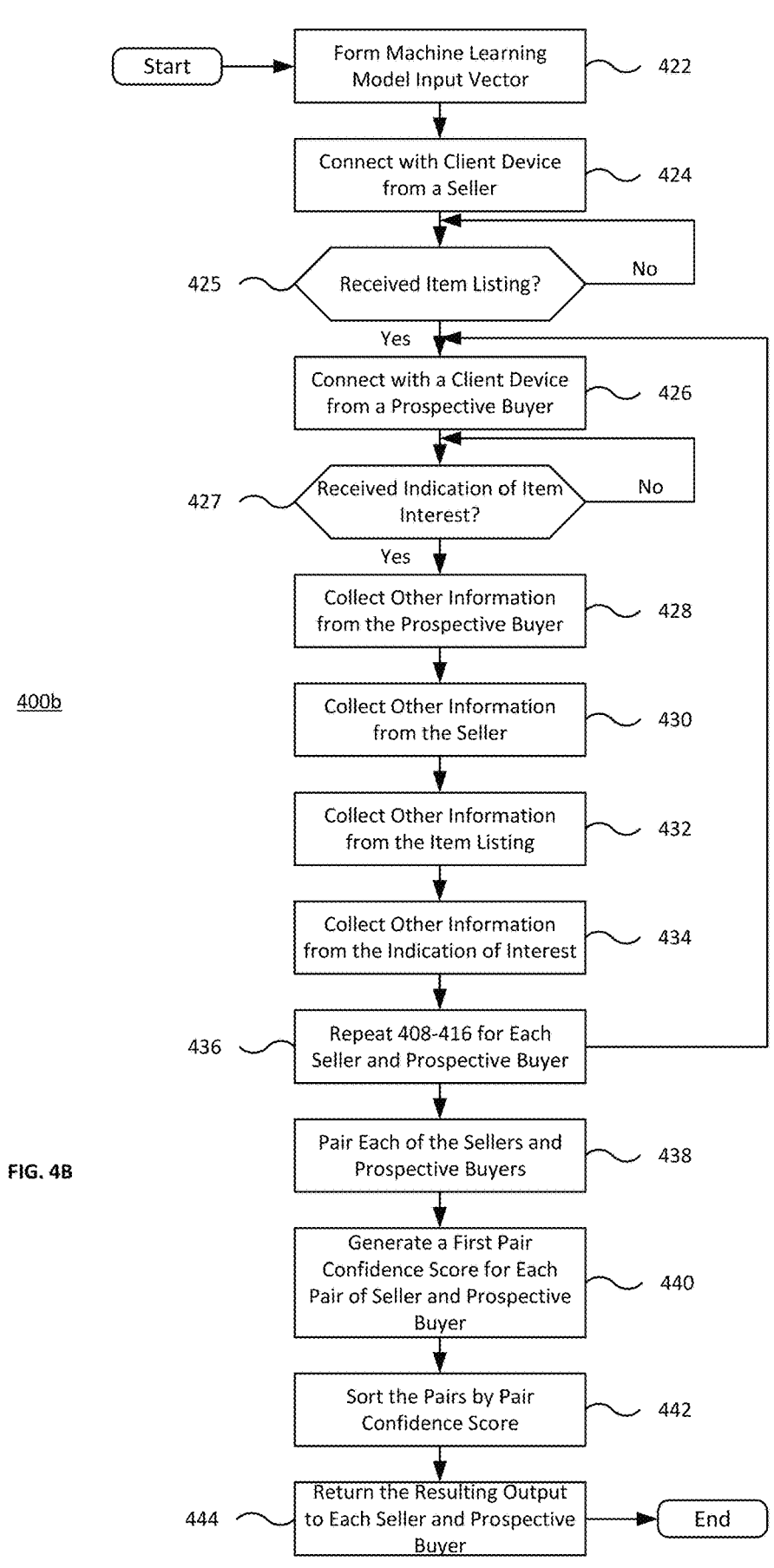
FIG. 4B depicts an exemplary flowchart representative of example methods, hardware logic, and instructions for implementing the prospective buyer and seller pairing system.

FIG. 4B depicts an exemplary computer-based method 400b for implementing pairings of prospective buyers and sellers. In some aspects, the method 400b may correspond to, and/or be implemented by, the application server 220 of FIG. 2.

The processes, methods, software, and/or computer-executable instructions included within the method 400b may be, or may include, an executable program or portion of an executable program for execution by a processor such as the one or more processors 102 of FIG. 1. The program may be embodied in software or instructions stored on a non-transitory computer-readable storage medium or disk associated with the one or more processor 102. Further, although the example program is described with reference to the flowchart illustrated in FIG. 4B, many other methods of implementing the application server 220 may alternatively be used. For example, the order of execution of the blocks may be changed, and/or some of the blocks described may be changed, eliminated, or combined.

Additionally, or alternatively, any or all of the blocks may be implemented by one or more hardware circuits (e.g., discrete and/or integrated analog and/or digital circuitry, an application specific integrated circuit (ASIC), a programmable logic device (PLD), a field programmable gate array (FPGA), a field programmable logic device (FPLD), a logic circuit, etc.) structured to perform the corresponding operation without executing software or firmware.

The method 400*b* of FIG. 4B may begin by using one or more sets of input data (e.g., property listing data, prospective buyer data, seller data, indication of interest data, location data, date data, and/or other data) to form an input vector (block 422). A prospective buyer and seller pairing system (e.g., application server 220) may use the input vector develop a machine learning model to determining pairings of prospective buyers and sellers via a machine learning training module 300.

The prospective buyer and seller pairing system may connect to a first client device from a seller (e.g., a seller device 202*b*) (block 424) via a website, a web application, a client device application, and/or the like over a network (e.g., the one or more networks 210). The prospective buyer and seller pairing system may wait until the prospective buyer and seller pairing system receives a property listing from the seller. The property listing may contain one or more data entries filled by the seller and transmitted by the first client device to the prospective buyer and seller pairing system over the network.

If the prospective buyer and seller pairing system has not received the property listing (block 425), the method 400*b* may return back to the start of block 425 until it receives a property listing. If the prospective buyer and seller pairing system has received a property listing (block 425), the prospective buyer and seller pairing system may connect to a second client device from a prospective buyer (e.g., a prospective buyer device 202*a*) (block 426) via a website, a web application, a client device application, and/or the like over the network. The prospective buyer recommendation system and/or the seller recommendation system may wait until the prospective buyer and seller pairing system receives an indication of interest from the prospective buyer. The indication of interest may be (i) a selected and or viewed property category by a prospective buyer, (ii) a selected or viewed property listing by a prospective buyer, (iii) a selected or viewed browsing history consisting of search tags, search terms, search filters, and the like by a prospective buyer, (iv) an entry onto a list of interested prospective buyers (such as a mailing list) by a prospective buyer, (v) a probability score of a prospective buyer to purchase a type of property, (vi) prospective buyer data (e.g., a prospective buyer indication of category interest, a prospective buyer wish list, a prospective buyer saved properties list, a prospective buyer purchase history, a prospective buyer indication of intent to purchase), and/or the like and transmitted by the second client device to the prospective buyer recommendation system and/or the seller recommendation system over the network.

If the prospective buyer and seller pairing system has not received the indication of interest (block 427), the method 400*a* may return back to the start of block 427 until it receives an indication of interest. If the prospective buyer and seller pairing system has received an indication of interest (block 427), the prospective buyer and seller pairing system may receive other information from the prospective buyer (e.g., the prospective buyer's purchase history, prior indications of categories of interest, search history, etc.) (block 428), other information from the seller (e.g., the seller's sale history, other property listings posted by the seller, etc.) (block 430), other information from the property listing (e.g., title, search tags, description, property category, etc.) (block 432), and/or other indications of interest from the prospective buyer (block 434). The prospective buyer and seller pairing system may repeat blocks 426-434 for each prospective buyer and/or seller (block 436).

The prospective buyer and seller pairing system may pair every prospective buyer with every seller (block 438). The prospective buyer and seller pairing system may pass the data gathered through the fully developed machine learning model (e.g., the machine learning model 320) to generate a first pair confidence score for each pairing of prospective buyer and seller (block 440). In some embodiments, the first pair confidence score may be determined by generating a prospective buyer recommendation score for the seller in the pairing, generating a seller recommendation score for the prospective buyer in the pairing, and processing the two recommendation scores (e.g., by taking the difference of the two recommendation scores, taking the higher recommendation score, prioritizing the prospective buyer's recommendation score, prioritizing the seller's recommendation score, some combination thereof, etc.). The prospective buyer and seller pairing system may sort the resulting list of pairings by the first pair confidence score based upon a "best fit" model (e.g., the pairings with a higher rank may have a higher likelihood of the prospective buyer purchasing property from a property listing of the seller) (block 442). The prospective buyer and seller pairing system may present the resulting list to the seller and/or prospective buyer via the first client device or second client device, respectfully (block 444). The method 400*b* may exit.

Exemplary Implementation of the Machine Learning Training Module

Figure 5:
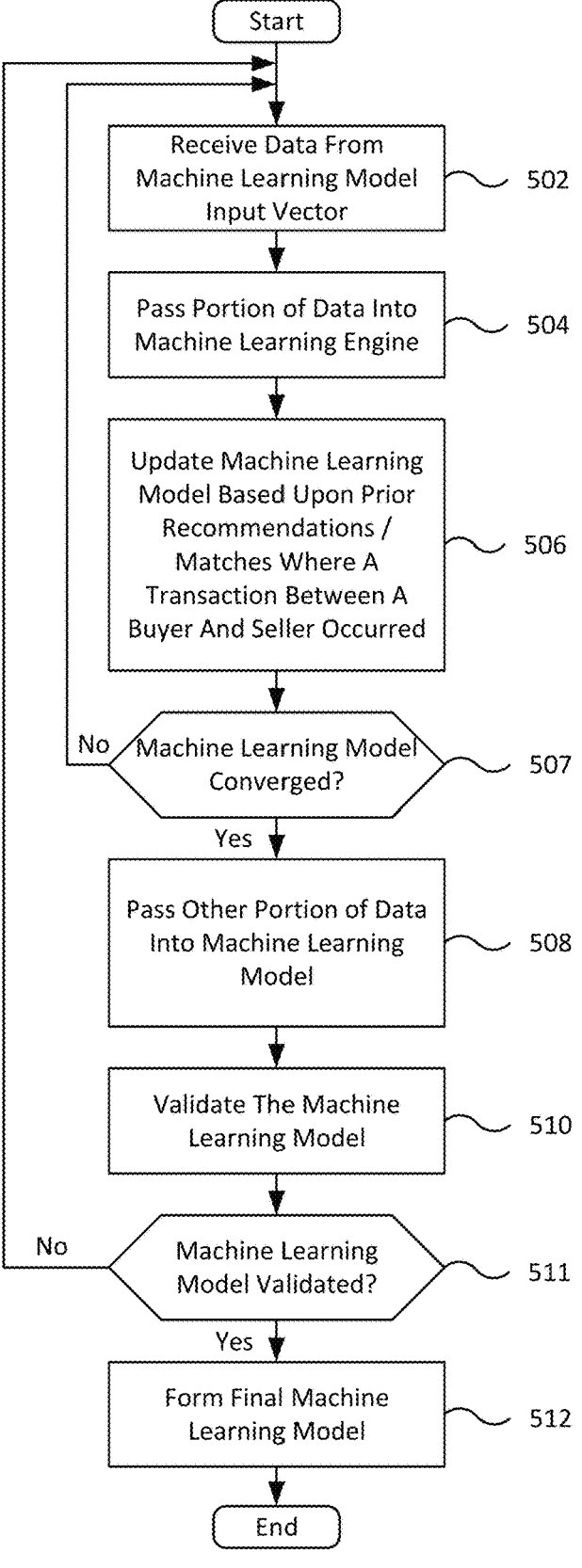
FIG. 5 depicts an exemplary flowchart representative of example methods, hardware logic and instructions for training and testing the machine learning models.

FIG. 5 depicts an exemplary computer-based method 500 for implementing the machine learning training module 300, according to some aspects. In some aspects, the method 500 may correspond to, and/or be implemented by, the training module 310, the machine learning model 320, and/or the scoring module 330 of FIG. 3.

The processes, methods, software, and/or computer-executable instructions included within the method 500 may be, or may include, an executable program or portion of an executable program for execution by a processor such as the one or more processors 102 of FIG. 1. The program may be embodied in software or instructions stored on a non-transitory computer-readable storage medium or disk associated with the one or more processor 102. Further, although the example program is described with reference to the flowchart illustrated in FIG. 5, many other methods of implementing the machine learning training module 300 may alternatively be used. For example, the order of execution of the blocks may be changed, and/or some of the blocks described may be changed, eliminated, or combined.

Additionally, or alternatively, any or all of the blocks may be implemented by one or more hardware circuits (e.g., discrete and/or integrated analog and/or digital circuitry, an application specific integrated circuit (ASIC), a programmable logic device (PLD), a field programmable gate array (FPGA), a field programmable logic device (FPLD), a logic circuit, etc.) structured to perform the corresponding operation without executing software or firmware.

The method 500 of FIG. 5 may begin when a prospective buyer recommendation system, a seller recommendation system, and/or a prospective buyer and seller pairing system receives, accesses, and/or otherwise obtains data to form an input vector (e.g., from a database storing training/testing data 312) (block 502). The method 500 may pass a portion of the data through the machine learning engine 314 (block 504). The method 500 may develop the machine learning model within the machine learning engine 314 by updating the developing machine learning model based upon comparisons between the testing module 316 and the outputs of the machine learning engine 314 (i.e., data of the prior requests and/or recommendations against the previous buyers who actually purchased from previous sellers) (block 506).

If training of the developing machine learning model has not converged (block 507), the method 500 may return back to the start of the process to obtain more data (via block 502), and redevelop the machine learning model (via blocks 504 and 506) to continue training and developing the machine learning model. If training of the developing machine learning model has converged (block 507), the remaining portion of the data may be passed through the machine learning engine 314 (block 508). The resulting outputs of the developing machine learning model may be used by the model validation module 318 to validate the developing machine learning model (block 510).

If the model validation module 318 validates the developing machine learning model validates (block 511), the developing machine learning model may become the machine learning model 320 (block 512) that may be applied to future instances the model has not yet seen, and the method 500 may exit from the method of FIG. 5. If the model validation module 318 does not validate the developing machine learning model (block 511), the method 500 may return back to the start of the process.

Exemplary Graphic User Interfaces

FIGS. 6A, 6B, 7A, 7B, and 8 depict exemplary interactive graphical user interfaces (GUIs) 600a, 600b, 700a, 700b, and 800, respectfully. In some aspects, the GUIs 600a, 600b, 700a, 700b, and 800 may correspond to, and/or be implemented by, the UI 232 of FIG. 2.

Figure 6B:
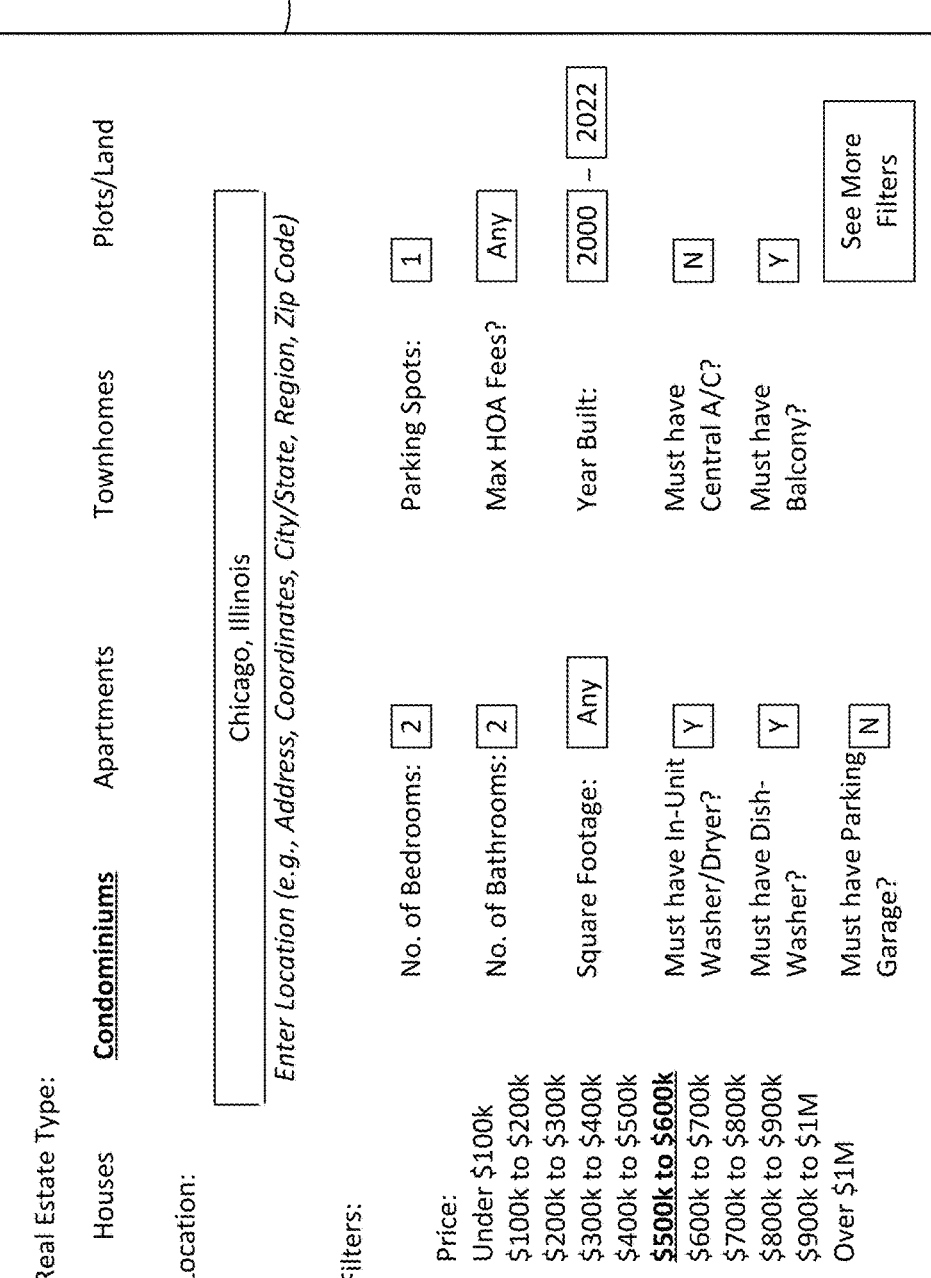
FIG. 6B depicts an exemplary user interface for search filters on an online marketplace

Details of operation of the prospective buyer and/or seller recommendation system and/or the prospective buyer and seller pairing system may be provided with respect to GUIs 600a, 600b, 700a, 700b, and 800. GUIs 600a, 600b, 700a, 700b, and 800 may be displayed on prospective buyer devices 202a and/or seller devices 202b based upon execution of non-transitory computer-executable instructions included in an application stored at the prospective buyer device 202a and/or the seller device 202b and/or stored at the application server 220 and accessed remotely by the prospective buyer device 202a and/or the seller device 202b. In particular, FIGS. 6A and 6B depict example GUIs that may be displayed on a prospective buyer device 202a. FIGS. 7A and 7B depict example GUIs that may be displayed on a prospective buyer device 202a and/or a seller device 202b. FIG. 8 depicts an example GUIs that may be displayed on a seller device 202b.

FIG. 6A depicts an example of an item online marketplace GUI 600a via which the prospective buyers may indicate an intent to purchase an item from a seller. Particularly, FIG. 6A depicts an example set of search filters 610 of the item online marketplace GUI 600a. The prospective buyer may select various options to narrow the scope of their search. In some embodiments, selecting a search filter may cause more options to appear in response. In this illustrative example, a prospective buyer has selected the department of "Electronics," the category of "Laptops," a price range of "$800 to $900," two processors, a RAM capacity of "32 GB," a display size of "14 in to 15 in" and "15 in to 16 in," an HD/SSD capacity of "500 GB to 1 TB" and "1 TB to 2 TB," a screen resolution of "4K," and a condition of "New." The prospective buyer may also select to see more filter options by clicking on a "See More Filters" interactive element and/or the like. The selected filters may narrow the number of matching (or similar) items listed in the marketplace that feature all the desired options of the prospective buyer. Additionally, the selections made by the prospective buyer may also form an indication of interest to be used in the prospective buyer and/or seller recommendation system and/or the prospective buyer and seller pairing system to determine if the prospective buyer has a likelihood of purchasing an item matching (or similar to) the selections made.

FIG. 6B depicts an example of a real estate online marketplace GUI 600b via which the prospective buyers may indicate an intent to purchase real estate from a seller. Particularly, FIG. 6B depicts an example set of search filters 620 of the real estate online marketplace GUI 600b. The prospective buyer may select various options to narrow the scope of their search. In some embodiments, selecting a search filter may cause more options to appear in response. In this illustrative example, a prospective buyer has selected the real estate type of "Condominiums," the location of "Chicago, Illinois," a price range of "$500 k to $600 k," two bedrooms, two bathrooms, one parking spot/space, an indication that the location must have an in-unit washer/dryer, an indication that the location must have a built-in dish-washer, an indication that the location must have a balcony, and that the location must have been built between the year 2000 and 2022. The prospective buyer may also select to see more filter options by clicking on a "See More Filters" interactive element and/or the like. The selected filters may narrow the number of matching (or similar) locations listed in the marketplace that feature all the desired options of the prospective buyer. Additionally, the selections made by the prospective buyer may also form an indication of interest to be used in the prospective buyer and/or seller recommendation system and/or the prospective buyer and seller pairing system to determine if the prospective buyer has a likelihood of purchasing a location matching (or similar to) the selections made.

FIG. 7A depicts a property listing 710 on an item online marketplace GUI 700a via. The property listing 710 may include a title, a price, an item categorization, a description as well as other interactive and non-interactive GUI elements (e.g., a "Buy Now" interactive GUI element, etc.). In this illustrative example, the property listing 710 features a laptop that has a price point of $850, two processors, a RAM capacity of 32 GB, a 15 inch display, 1 TB SSD, and 4$k$ screen resolution. This property listing 710 may appear in the prospective buyers' search results based upon the selected search filters as shown in FIG. 6A. Additionally, the property listing 710 may be used in the prospective buyer and/or seller recommendation system and/or the prospective buyer and seller pairing system to determine if the prospective buyer has a likelihood of purchasing the property listed based upon other indications of interest set forth by the prospective buyer.

FIG. 7B depicts a real estate listing 720 on a real estate online marketplace GUI 700a via. The real estate listing 720 may include an address, a price, a home type, a description as well as other interactive and non-interactive GUI elements (e.g., a "Contact Info" interactive GUI element that may provide prospective buyers the contact information of the seller, etc.). In this illustrative example, the real estate listing 720 features a condominium located in Chicago, Illinois that was built in 2002 and has a price point of $550,000, two bedrooms, two bathrooms, an in-unit washer-dryer, a built-in dish-washer, a balcony. This real estate listing 720 may appear in the prospective buyers' search results based upon the selected search filters as shown in FIG. 6B. Additionally, the real estate listing 720 may be used in the prospective buyer and/or seller recommendation system and/or the prospective buyer and seller pairing system to determine if the prospective buyer has a likelihood of purchasing the real estate listed based upon other indications of interest set forth by the prospective buyer.

FIG. 8 depicts an example of a recommendation and/or pairing results 810 on an item and/or real estate marketplace GUI 800. In this illustrative example, prospective buyer recommendations are displayed in a tab separate from pairing results and sale history (each of which may also be viewed under their own respective tabs). In a prospective buyer recommendation, the prospective buyer recommendation system may display the prospective buyer with the greatest confidence score on each property listing and/or real estate listing posted by the seller. In some other embodiments, the prospective buyer recommendations may show more than one prospective buyer per property listing and/or real estate listing (either the full listing or a portion thereof) in which case the prospective buyers may be ranked according to their assigned confidence scores. Similarly, the pairing results under the "Matched Buyers" tab may also feature a similar looking output; however, the results come from confidence scores assigned to each pairing of prospective buyers and sellers rather than just confidence scores assigned to prospective buyers' likelihood to purchase an item and/or real estate. Further, a similar GUI may also exist for prospective buyers looking to find a particular seller, property listing, and/or real estate listing using a seller recommendation system.

It should be appreciated that the UIs 600*a*, 600*b*, 700*a*, 700*b*, and 800 are exemplary in nature and additional and/or alternative features, elements, and/or implementations of the GUIs are contemplated.

Exemplary Method Of Recommending Prospective Buyers/Sellers

FIG. 9 depicts an exemplary computer-implemented method 900 for recommending a prospective buyer and/or seller. The method 900 depicted in FIG. 9 may employ any of the techniques, methods, and systems described herein with respect to FIGS. 1-8.

The method 900 may begin at block 902 by training, by one or more processors, a machine learning model using a set of training data related to previously recommended prospective buyers. A machine learning module (e.g., machine learning module 242) may generate a machine learning model based upon training data from previously recommended prospective buyers and/or sellers. The training data may include, for each previously recommended prospective buyer and/or seller, a set of characteristics of the previously recommended prospective buyers and/or sellers, and a set of previous buyers who actually purchased from previous sellers.

The machine learning module may test the machine learning model generated. In some embodiments, the test may be conducted using the machine learning technique used to generate the model (e.g., gradient boosting, neural networks, deep learning, linear regression, polynomial regression, support vector machines, decision trees, random forests, nearest neighbors, or any other suitable machine learning technique). Further, in some embodiments, the testing data may be from the same collection of data as the training data. In these embodiments, the training data is divided into a ratio of training data and testing data (e.g., 20% training data and 80% testing data). The training data generates the machine learning model and the testing data determines the accuracy of the model. When the machine learning module is correct more than a predetermined threshold amount, the machine learning model may be used for recommending prospective buyers and/or sellers. However, if the machine learning module is not correct more than the threshold amount, the machine learning module may continue obtaining sets of training data and/or testing data for further training and/or testing.

The method 900 may proceed to block 904 by receiving, by the one or more processors, a property listing (i) representative of a property possessed by and/or offered for sale by a seller and (ii) including one or more parameters of the property.

The method 900 may proceed to block 906 by accessing, by the one or more processors, one or more indications of interest associated with one or more prospective buyers, the one or more indications of interest including one or more characteristics of one or more properties for potential acquisition by the one or more prospective buyers. The one or more indications of interest may include (i) a selected and or viewed property category by a prospective buyer, (ii) a selected or viewed property listing by a prospective buyer, (iii) a selected or viewed browsing history consisting of search tags, search terms, search filters, and the like by a prospective buyer, (iv) an entry onto a list of interested prospective buyers (such as a mailing list) by a prospective buyer, (v) a probability score of a prospective buyer to purchase a type of property, (vi) prospective buyer data (e.g., a prospective buyer indication of category interest, a prospective buyer wish list, a prospective buyer saved property list, a prospective buyer purchase history, a prospective buyer indication of intent to purchase, etc.), and/or the like. Any of the foregoing input data may be submitted by a prospective buyer and/or determined by the prospective buyer recommendation system and/or the seller recommendation system.

The method 900 may proceed to block 908 by analyzing, by the one or more processors using the machine learning model, the one or more parameters of the property and the one or more indications of interest to generate, for each prospective buyer of the one or more prospective buyers, a recommendation score. In some embodiments, the recommendation score may be generated for each seller of one or more sellers. The recommendation score may indicate the probability that a prospective buyer will purchase from a seller based upon the trained machine learning model and the set of characteristics of the input data. The prospective buyers and/or sellers may then be sorted according to the value of the recommendation score.

The method 900 may proceed to block 910 by communicating, by the one or more processors to an electronic device associated with the seller, information indicative of at least a portion of the one or more recommendation scores for the one or more prospective buyers.

Exemplary Method of Automated Pairing of Sellers and Prospective Buyers

FIG. 10 depicts an exemplary computer-implemented method 1000 for the automated pairing of sellers and prospective buyers. The method 1000 depicted in FIG. 10 may employ any of the machine learning techniques, methods, and systems described herein with respect to FIGS. 1-9.

The method 100 may begin at block 1002 by training, by one or more processors, a machine learning model using a set of training data related to previously paired prospective buyers and sellers. A machine learning module (e.g., machine learning module 242) may generate a machine learning model based upon training data from previously paired prospective buyers and sellers. The training data may include, for each previously paired prospective buyer and seller, a set of characteristics of the previously paired prospective buyers and sellers, and/or a set of previous buyers who actually purchased from previous sellers.

The machine learning module may test the machine learning model generated. In some embodiments, the test may be conducted using the machine learning technique used to generate the model (e.g., gradient boosting, neural networks, deep learning, linear regression, polynomial regression, support vector machines, decision trees, random forests, nearest neighbors, or any other suitable machine learning technique). Further, in some embodiments, the testing data may be from the same collection of data as the training data. In these embodiments, the training data is divided into a ratio of training data and testing data (e.g., 20% training data and 80% testing data). The training data generates the machine learning model and the testing data determines the accuracy of the model. When the machine learning module is correct more than a predetermined threshold amount, the machine learning model may be used for pairing prospective buyers and sellers. However, if the machine learning module is not correct more than the threshold amount, the machine learning module may continue obtaining sets of training data and/or testing data for further training and/or testing.

The method 1000 may proceed to block 1004 by receiving, by the one or more processors, one or more property listings (i) representative of one or more properties possessed by and/or offered for sale by one or more sellers via transaction and (ii) including one or more parameters of the one or more properties.

The method 1000 may proceed to block 1006 by accessing, by the one or more processors, one or more indications of interest associated with one or more prospective buyers, the one or more indications of interest including one or more characteristics of one or more properties for potential acquisition by the one or more prospective buyers. The one or more indications of interest may include (i) a selected and or viewed property category by a prospective buyer, (ii) a selected or viewed property listing by a prospective buyer, (iii) a selected or viewed browsing history consisting of search tags, search terms, search filters, and the like by a prospective buyer, (iv) an entry onto a list of interested prospective buyers (such as a mailing list) by a prospective buyer, (v) a probability score of a prospective buyer to purchase a type of property, (vi) prospective buyer data (e.g., a prospective buyer indication of category interest, a prospective buyer wish list, a prospective buyer saved properties list, a prospective buyer purchase history, a prospective buyer indication of intent to purchase, etc.), and/or the like. Any of the foregoing input data may be submitted by a prospective buyer and/or determined by the prospective buyer recommendation system and/or the seller recommendation system.

The method 1000 may proceed to block 1008 by generating, by the one or more processors, a set of pairings of the one or more sellers and the one or more prospective buyers.

The method 1000 may proceed to block 1010 by analyzing, by the one or more processors using the machine learning model, the one or more parameters of the one or more properties and the one or more indications of interest to generate, for each pairing of the set of pairings, a pair confidence score. The pair confidence score may indicate the probability that a prospective buyer will purchase from a seller based upon the trained machine learning model and the set of characteristics of the input data. The pairings of prospective buyers and sellers may then be sorted according to the value of the pair confidence score. In some embodiments, the sorting may be performed by (i) prioritizing the pair confidence scores according to the prospective buyers (e.g., selecting pairings where each prospective buyer has the highest pair confidence score), (ii) prioritizing the pair confidence scores according to the sellers (e.g., selecting pairings where each seller has the highest pair confidence score), (iii) selecting pairs based upon pair confidence scores between prospective buyers and sellers (e.g., the relative greatest pair confidence score between each of the prospective buyers and sellers), and/or the like.

The method 1000 may proceed to block 1012 by communicating, by the one or more processors to one or more electronic devices associated with at least one of (i) the one or more sellers or (ii) the one or more prospective buyers, information indicative of at least a portion of the set of pairings based upon the pair confidence score.

Exemplary Method of Determining Potential Sellers

FIG. 11 depicts an exemplary computer-implemented method 1100 for determining potential sellers. The method 1100 depicted in FIG. 11 may employ any of the techniques, methods, and systems described herein with respect to FIGS. 1-10.

The method 1100 may begin at block 1102 by training, by one or more processors, a machine learning model using a set of training data related to previously determined sellers. A machine learning module (e.g., machine learning module 242) may generate a machine learning model based upon training data from previously determined sellers (e.g., potential sellers determined they would sell one or more property of interest to a buyer and then later confirmed that they did sell and/or offer to sell the one or more property of interest). The training data may include, for each potential seller, a set of characteristics of the previously determined sellers, and a set of previously determined sellers who actually sold and/or offered to sell the one or more properties of interest.

The machine learning module may test the machine learning model that was generated. In some embodiments, the test may be conducted using the machine learning technique used to generate the model (e.g., gradient boosting, neural networks, deep learning, linear regression, polynomial regression, support vector machines, decision trees, random forests, nearest neighbors, or any other suitable machine learning technique). Further, in some embodiments, the testing data may be from the same collection of data as the training data. In these embodiments, the training data is divided into a ratio of training data and testing data (e.g., 20% training data and 80% testing data). The training data generates the machine learning model and the testing data determines the accuracy of the model. When the machine learning module is correct more than a predetermined threshold amount, the machine learning model may be used for recommending prospective buyers and/or sellers. However, if the machine learning module is not correct more than the threshold amount, the machine learning module may continue obtaining sets of training data and/or testing data for further training and/or testing.

The method 1100 may proceed to block 1104 by receiving, by the one or more processors, a buyer request from a prospective buyer, the buyer request (i) representative of one or more properties possessed by a potential seller, (ii) including one or more parameters of the one or more properties, and (iii) including one or more indications of interest in buying the one or more properties, the one or more indications of interest in buying the one or more properties including one or more characteristics of one or more properties for potential acquisition by the one or more prospective buyers. The one or more indications of interest in buying the one or more properties may include (i) a selected and or viewed property category by a prospective buyer, (ii) a selected or viewed property listing by a prospective buyer, (iii) a selected or viewed browsing history consisting of search tags, search terms, search filters, and the like by a prospective buyer, (iv) an entry onto a list of interested prospective buyers (such as a mailing list) by a prospective buyer, (v) a probability score of a prospective buyer to purchase a type of property, (vi) prospective buyer data (e.g., a prospective buyer indication of category interest, a prospective buyer wish list, a prospective buyer saved property list, a prospective buyer purchase history, a prospective buyer indication of intent to purchase, etc.), and/or the like. Any of the foregoing input data may be submitted by a buyer and/or prospective buyer and/or determined by the seller determination system.

The method 1100 may proceed to block 1106 by accessing, by the one or more processors, one or more databases of one or more potential sellers, the one or more databases including (i) the one or more properties possessed by the one or more potential sellers that have one or more parameters of the buyer request and (ii) one or more indications of interest in selling the one or more properties from one or more potential sellers. The one or more indications of interest in selling the one or more properties may include (i) access of the one or more marketplaces by a potential seller, (ii) a selected and or viewed property category by a potential seller, (iii) a selected or viewed one or more prospective buyers of one or more properties corresponding to the one or more properties in a potential seller's possession, (iii) a selected or viewed browsing history consisting of search tags, search terms, search filters, and the like by a potential seller, (iv) an entry onto a list of interested potential sellers (such as a mailing list) by a potential seller, (v) a probability score of a potential seller to sell a type of property, (vi) potential seller data (e.g., a potential seller indication of category interest, an incomplete and/or not live and/or not active property listing, a potential seller sale history, a potential seller indication of intent to sell, etc.), and/or the like. Any of the foregoing input data may be submitted by a seller and/or potential seller and/or determined by the seller determination system.

The method 1100 may proceed to block 1108 by analyzing, by the one or more processors using the machine learning model, the buyer request and the one or more databases of potential sellers to determine, for each potential seller, a prediction score on the potential seller's likelihood to sell the one or more properties. In some embodiments, the prediction score may be generated for each potential seller of one or more potential sellers. The prediction score may indicate the probability that a potential seller will sell one or more properties in their possession based upon the trained machine learning model and the set of characteristics of the input data.

The method 1100 may proceed to block 1100 by determining, by the one or more processors, whether the potential seller is willing to sell the one or more properties to the buyer based upon the prediction score. The seller determination system may make this determination by comparing the prediction score to a threshold value (e.g., 0.8) and a prediction score with a value less than the threshold value may have a determination of "will likely not sell" and a prediction score with a value greater than the threshold value may have a determination of "will likely sell."

The method 1100 may proceed to block 1112 by communicating, by the one or more processors to an electronic device, information indicative of the determination of whether the potential seller is willing to sell the one or more properties. In some embodiments, the electronic device is associated with the buyer.

Additional Exemplary Embodiments: Prospective Buyer/ Seller Recommendation System In one aspect, a computer-implemented method for recommending prospective buyers and/or sellers of properties to sellers may be provided. The method may be implemented via one or more local and/or remote processors, transceivers, sensors, servers, memory units, mobile devices, wearables, smart glasses, augmented reality glasses, virtual reality headsets, and/or other electronic and/or electrical components. In one instance, the method may include: (1) training, by one or more processors, a machine learning model using a set of training data related to previously recommended prospective buyers and/or sellers; (2) receiving, by the one or more processors, a property listing (i) representative of a property possessed by and/or offered for sale by one or more sellers and (ii) potentially including one or more parameters of the property; (3) accessing, by the one or more processors, one or more indications of interest associated with one or more prospective buyers, the one or more indications of interest potentially including one or more characteristics of one or more properties for potential acquisition by the one or more prospective buyers; (4) analyzing, by the one or more processors using the machine learning model, the one or more parameters of the property and the one or more indications of interest to generate, for each prospective buyer of the one or more prospective buyers and/or for each seller of the one or more sellers, a recommendation score; and/or (5) communicating, by the one or more processors to an electronic device associated with the one or more prospective buyers and/or one or more sellers, information indicative of at least a portion of the one or more recommendation scores for the one or more prospective buyers and/or one or more sellers. The method may include additional, less, or alternate actions, including those discussed elsewhere herein.

For instance, additionally or alternatively to the foregoing method, the set of training data may include one or more of (i) one or more sellers, (ii) one or more prior property listings, (iii) one or more prior prospective buyers, and/or (iv) one or more prior indications of interest. Additionally or alternatively to the foregoing method, wherein (i) the one or more sellers may include one or more of (a) one or more seller identifiers, (b) one or more list of previously sold properties, (c) one or more lists of prior property listings, and/or (d) one or more property categorizations the seller intends to categorize property listings; (ii) the one or more prior property listings may include one or more of (a) one or more property titles, (b) one or more property categorizations, (c) one or more property search tags, and/or (d) one or more property descriptions; (iii) the one or more prior prospective buyers may include one or more of (a) one or more prospective buyer identifiers, (b) one or more lists of prior properties purchased, (c) one or more indications of categorizations of interest, (d) one or more property wish lists, (e) one or more lists of saved properties for later purchase, and/or (f) one or more indications of an intent to purchase within a time period; (iv) the one or more prior indications of interest may include one or more of (a) one or more search terms, (b) one or more selected property categorizations, (c) one or more selected property search tags, (d) one or more selected property parameters, and/or (e) one or more selected property descriptions.

Additionally or alternatively to the foregoing method, training the machine learning model may further include: generating, by the one or more processors, a training recommendation score for each of the one or more prior prospective buyers based upon a set of previously recommended prior prospective buyers and the set of training data; determining, by the one or more processors, each of the previously recommended prior prospective buyers purchased a property associated with the one or more prior property listings; reducing, by the one or more processors, a percent rate of error of determining each of the previously recommended prior prospective buyers that purchased a property associated with the one or more prior property listings by calculating one or more of: (i) an ordinary least squares of a difference between the one or more prospective buyers with the training recommendation score with a greatest value and the one or more prospective buyers that purchased a property associated with the one or more prior property listings, or (ii) an ordinary mean square of an aggregation of a resulting output between the one or more prospective buyers with the training recommendation score with the greatest value and the one or more prospective buyers that purchased a property associated with the one or more prior property listings; and/or generating, by the one or more processors, a confidence interval based upon one or more of: (i) the one or more prospective buyers with the training recommendation score with the greatest value, (ii) the one or more prospective buyers that actually purchased a property associated with the one or more prior property listings, and/or (iii) one or more standard deviations from the resulting output.

Additionally or alternatively to the foregoing method, analyzing the one or more parameters of the property and the one or more indications of interest may further include: generating, by the one or more processors, the recommendation score based upon (i) the one or more parameters of the property, (ii) the one or more indications of interest, (iii) the set of training data, and (iv) the one or more prospective buyers.

Additionally or alternatively to the foregoing method, the method may further include: determining, by the one or more processors, that the one or more prospective buyers with the recommendation score with the greatest value purchased the property; and/or updating, by the one or more processors, the set of training data by adding the one or more prospective buyers with the recommendation score with the greatest value and the determination of the one or more prospective buyers with the recommendation score with the greatest value purchasing the property to the set of training data.

In another aspect, a computer system for recommending prospective buyers of properties to sellers may be provided. The computer system may be configured to include one or more local and/or remote processors, transceivers, sensors, servers, memory units, mobile devices, wearables, smart glasses, augmented reality glasses, virtual reality headsets, and/or other electronic and/or electrical components. In one instance, the computer system may include one or more processors; and/or a non-transitory program memory coupled to the one or more processors and/or storing executable instructions that, when executed by the one or more processors, cause the computer system to: (1) train a machine learning model using a set of training data related to previously recommended prospective buyers and/or sellers; (2) receive a property listing (i) representative of a property possessed by and/or offered for sale by one or more sellers and (ii) potentially including one or more parameters of the property; (3) access one or more indications of interest associated with one or more prospective buyers, the one or more indications of interest potentially including one or more characteristics of one or more properties for potential acquisition by the one or more prospective buyers; (4) analyze, using the machine learning model, the one or more parameters of the property and the one or more indications of interest to generate, for each prospective buyer of the one or more prospective buyers and/or for each seller of the one or more sellers, a recommendation score; and/or (5) communicating, by the one or more processors to an electronic device associated with the one or more prospective buyers and/or one or more sellers, information indicative of at least a portion of the one or more recommendation scores for the one or more prospective buyers and/or one or more sellers. The computer system may be configured to include additional, less, or alternate functionality, including that discussed elsewhere herein.

For instance, additionally or alternatively the foregoing system, the set of training data may include one or more of (i) one or more sellers, (ii) one or more prior property listings, (iii) one or more prior prospective buyers, and/or (iv) one or more prior indications of interest. Additionally or alternatively to the foregoing system, wherein (i) the one or more sellers may include one or more of (a) one or more seller identifiers, (b) one or more list of previously sold properties, (c) one or more lists of prior property listings, and/or (d) one or more property categorizations the seller intends to categorize property listings; (ii) the one or more prior property listings may include one or more of (a) one or more property titles, (b) one or more property categorizations, (c) one or more property search tags, and/or (d) one or more property descriptions; (iii) the one or more prior prospective buyers may include one or more of (a) one or more prospective buyer identifiers, (b) one or more lists of prior properties purchased, (c) one or more indications of categorizations of interest, (d) one or more property wish lists, (e) one or more lists of saved properties for later purchase, and/or (f) one or more indications of an intent to purchase within a time period; (iv) the one or more prior indications of interest may include one or more of (a) one or more search terms, (b) one or more selected property categorizations, (c) one or more selected property search tags, (d) one or more selected property parameters, and/or (e) one or more selected property descriptions.

Additionally or alternatively to the foregoing system, training the machine learning model may further cause the system to: generate a training recommendation score for each of the one or more prior prospective buyers based upon a set of previously recommended prior prospective buyers and the set of training data; determine each of the previously recommended prior prospective buyers purchased a property associated with the one or more prior property listings; reduce a percent rate of error of determining each of the previously recommended prior prospective buyers that purchased a property associated with the one or more prior property listings by calculating one or more of: (i) an ordinary least squares of a difference between the one or more prospective buyers with the training recommendation score with a greatest value and the one or more prospective buyers that purchased a property associated with the one or more prior property listings, or (ii) an ordinary mean square of an aggregation of a resulting output between the one or more prospective buyers with the training recommendation score with the greatest value and the one or more prospective buyers that purchased a property associated with the one or more prior property listings; and/or generate a confidence interval based upon one or more of: (i) the one or more prospective buyers with the training recommendation score with the greatest value, (ii) the one or more prospective buyers that actually purchased a property associated with the one or more prior property listings, and/or (iii) one or more standard deviations from the resulting output.

Additionally or alternatively to the foregoing system, analyzing the one or more parameters of the property and the one or more indications of interest may further cause the system to: generate the recommendation score based upon (i) the one or more parameters of the property, (ii) the one or more indications of interest, (iii) the set of training data, and (iv) the one or more prospective buyers.

Additionally or alternatively to the foregoing system, the instructions may further cause the system to: determine that the one or more prospective buyers with the recommendation score with the greatest value purchased the property; and/or update the set of training data by adding the one or more prospective buyers with the recommendation score with the greatest value and the determination of the one or more prospective buyers with the recommendation score with the greatest value purchasing the property to the set of training data.

In another aspect, a tangible, a non-transitory computer-readable medium may store executable instructions for recommending prospective buyers of properties to sellers may be provided. The executable instructions, when executed, may cause one or more processors to: (1) train a machine learning model using a set of training data related to previously recommended prospective buyers and/or sellers; (2) receive a property listing (i) representative of a property possessed by and/or offered for sale by one or more sellers and (ii) potentially including one or more parameters of the property; (3) access one or more indications of interest associated with one or more prospective buyers, the one or more indications of interest potentially including one or more characteristics of one or more properties for potential acquisition by the one or more prospective buyers; (4) analyze, using the machine learning model, the one or more parameters of the property and the one or more indications of interest to generate, for each prospective buyer of the one or more prospective buyers and/or for each seller of the one or more sellers, a recommendation score; and/or (5) communicating, by the one or more processors to an electronic device associated with the one or more prospective buyers and/or one or more sellers, information indicative of at least a portion of the one or more recommendation scores for the one or more prospective buyers and/or one or more sellers. The instructions may direct additional, less, or alternate functionality, including that discussed elsewhere herein.

For instance, additionally or alternatively the foregoing executable instructions, the set of training data may include one or more of (i) one or more sellers, (ii) one or more prior property listings, (iii) one or more prior prospective buyers, and/or (iv) one or more prior indications of interest. Additionally or alternatively to the foregoing executable instructions, wherein (i) the one or more sellers may include one or more of (a) one or more seller identifiers, (b) one or more list of previously sold properties, (c) one or more lists of prior property listings, and/or (d) one or more property categorizations the seller intends to categorize property listings; (ii) the one or more prior property listings may include one or more of (a) one or more property titles, (b) one or more property categorizations, (c) one or more property search tags, and/or (d) one or more property descriptions; (iii) the one or more prior prospective buyers may include one or more of (a) one or more prospective buyer identifiers, (b)

one or more lists of prior properties purchased, (c) one or more indications of categorizations of interest, (d) one or more property wish lists, (e) one or more lists of saved properties for later purchase, and/or (f) one or more indications of an intent to purchase within a time period; (iv) the one or more prior indications of interest may include one or more of (a) one or more search terms, (b) one or more selected property categorizations, (c) one or more selected property search tags, (d) one or more selected property parameters, and/or (e) one or more selected property descriptions.

Additionally or alternatively to the foregoing executable instructions, training the machine learning model may further cause the one or more processors to: generate a training recommendation score for each of the one or more prior prospective buyers based upon a set of previously recommended prior prospective buyers and the set of training data; determine each of the previously recommended prior prospective buyers purchased a property associated with the one or more prior property listings; reduce a percent rate of error of determining each of the previously recommended prior prospective buyers that purchased a property associated with the one or more prior property listings by calculating one or more of: (i) an ordinary least squares of a difference between the one or more prospective buyers with the training recommendation score with a greatest value and the one or more prospective buyers that purchased a property associated with the one or more prior property listings, or (ii) an ordinary mean square of an aggregation of a resulting output between the one or more prospective buyers with the training recommendation score with the greatest value and the one or more prospective buyers that purchased a property associated with the one or more prior property listings; and/or generate a confidence interval based upon one or more of: (i) the one or more prospective buyers with the training recommendation score with the greatest value, (ii) the one or more prospective buyers that actually purchased a property associated with the one or more prior property listings, and/or (iii) one or more standard deviations from the resulting output.

Additionally or alternatively to the foregoing executable instructions, analyzing the one or more parameters of the property and the one or more indications of interest may further cause the system to: generate the recommendation score based upon (i) the one or more parameters of the property, (ii) the one or more indications of interest, (iii) the set of training data, and (iv) the one or more prospective buyers.

Additionally or alternatively to the foregoing executable instructions, the executable instructions may further cause the one or more processors to: determine that the one or more prospective buyers with the recommendation score with the greatest value purchased the property; and/or update the set of training data by adding the one or more prospective buyers with the recommendation score with the greatest value and the determination of the one or more prospective buyers with the recommendation score with the greatest value purchasing the property to the set of training data.

Additional Exemplary Embodiments: Prospective Buyer and Seller Pairing System

In one aspect, a computer-implemented method for automated paring of sellers and prospective buyers may be provided. The method may be implemented via one or more local and/or remote processors, transceivers, sensors, servers, memory units, mobile devices, wearables, smart glasses, augmented reality glasses, virtual reality headsets, and/or other electronic and/or electrical components. In one instance, the method may include: (1) training, by one or more processors, a machine learning model using a set of training data related to previously paired prospective buyers and sellers; (2) receiving, by the one or more processors, one or more property listings (i) representative of one or more properties possessed by and/or offered for sale by one or more sellers via transaction and (ii) potentially including one or more parameters of the one or more properties; (3) accessing, by the one or more processors, one or more indications of interest associated with one or more prospective buyers, the one or more indications of interest potentially including one or more characteristics of one or more properties for potential acquisition by the one or more prospective buyers; (4) generating, by the one or more processors, a set of pairings of the one or more sellers and the one or more prospective buyers; (5) analyzing, by the one or more processors using the machine learning model, the one or more parameters of the one or more properties and the one or more indications of interest to generate, for each pairing of the set of pairings, a pair confidence score; and/or (6) communicating, by the one or more processors to one or more electronic devices associated with at least one of (i) the one or more sellers or (ii) the one or more prospective buyers, information indicative of at least a portion of the set of pairings based upon the pair confidence score. The method may include additional, less, or alternate actions, including those discussed elsewhere herein.

For instance, additionally or alternatively to the foregoing method, the set of training data may include one or more of (i) one or more sellers, (ii) one or more prior property listings, (iii) one or more prior prospective buyers, and/or (iv) one or more prior indications of interest. Additionally or alternatively to the foregoing method, wherein (i) the one or more sellers may include one or more of (a) one or more seller identifiers, (b) one or more list of previously sold properties, (c) one or more lists of prior property listings, and/or (d) one or more property categorizations the seller intends to categorize property listings; (ii) the one or more prior property listings may include one or more of (a) one or more property titles, (b) one or more property categorizations, (c) one or more property search tags, and/or (d) one or more property descriptions; (iii) the one or more prior prospective buyers may include one or more of (a) one or more prospective buyer identifiers, (b) one or more lists of prior properties purchased, (c) one or more indications of categorizations of interest, (d) one or more property wish lists, (e) one or more lists of saved properties for later purchase, and/or (f) one or more indications of an intent to purchase within a time period; (iv) the one or more prior indications of interest may include one or more of (a) one or more search properties, (b) one or more selected property categorizations, (c) one or more selected property search tags, (d) one or more selected property parameters, and/or (e) one or more selected property descriptions.

Additionally or alternatively to the foregoing method, training the machine learning model may further include: generating, by the one or more processors, a set of training pairings of the one or more sellers and the one or more prospective buyers; generating, by the one or more processors, a training pair confidence score for each training pairing in the set of training pairings based upon the set of training data; determining, by the one or more processors, the prior prospective buyers in each training purchased a property associated with the one or more prior property listings from a paired seller; reducing, by the one or more processors, the percent rate of error of determining the prior prospective buyers in each training purchased a property associated with the one or more prior property listings from the paired seller by calculating one or more of: (i) the ordinary least squares of the difference between the training pairing with the training pair confidence score with a greatest value and the one or more prospective buyers that actually purchased a property associated with the one or more prior property listings from the paired seller, or (ii) the ordinary mean square of an aggregation of a resulting output between the training pairing with the training pair confidence score with a greatest value and the one or more prospective buyers that actually purchased a property associated with the one or more prior property listings from the paired seller; and/or generating, by the one or more processors, a confidence interval based upon one or more of: (i) the one or more prospective buyers with the training pair confidence score with the greatest value, (ii) the one or more prospective buyers that actually purchased a property associated with the one or more prior property listings from the paired seller, and/or (iii) one or more standard deviations from the resulting output.

Additionally or alternatively to the foregoing method, analyzing the one or more parameters of the one or more properties and the one or more indications of interest may further include: generating, by the one or more processors, the pair confidence score based upon (i) the one or more parameters of the property, (ii) the one or more indications of interest, (iii) the set of training data, (iv) the one or more prospective buyers, and (v) the one or more sellers.

Additionally or alternatively to the foregoing method, the method may further include: determining, by the one or more processors, that the one or more prospective buyers with the recommendation score with the greatest value purchased the property and/or sellers with the recommendation score with the greatest value sold the property; and/or updating, by the one or more processors, the set of training data by adding the one or more prospective buyers with the recommendation score with the greatest value, the one or more sellers with the recommendation score with the greatest value, the determination of the one or more prospective buyers with the recommendation score with the greatest value purchasing the property, and/or the determination of the one or more sellers with the recommendation score with the greatest value selling the property to the set of training data.

In another aspect, a computer system for automated paring of sellers and prospective buyers may be provided. The computer system may be configured to include one or more local and/or remote processors, transceivers, sensors, servers, memory units, mobile devices, wearables, smart glasses, augmented reality glasses, virtual reality headsets, and/or other electronic and/or electrical components. In one instance, the computer system may include one or more processors; and/or a non-transitory program memory coupled to the one or more processors and/or storing executable instructions that, when executed by the one or more processors, cause the computer system to: (1) train a machine learning model using a set of training data related to previously paired prospective buyers and sellers; (2) receive one or more property listings (i) representative of one or more properties possessed by and/or offered for sale by one or more sellers via transaction and (ii) potentially including one or more parameters of the one or more properties; (3) access one or more indications of interest associated with one or more prospective buyers, the one or more indications of interest potentially including one or more characteristics of one or more properties for potential acquisition by the one or more prospective buyers; (4) generate a set of pairings of the one or more sellers and the one or more prospective buyers; (5) analyze, using the machine learning model, the one or more parameters of the one or more properties and the one or more indications of interest to generate, for each pairing of the set of pairings, a pair confidence score; and/or (6) communicate, to one or more electronic devices associated with at least one of (i) the one or more sellers or (ii) the one or more prospective buyers, information indicative of at least a portion of the set of pairings based upon the pair confidence score. The computer system may be configured to include additional, less, or alternate functionality, including that discussed elsewhere herein.

For instance, additionally or alternatively the foregoing system, the set of training data may include one or more of (i) one or more sellers, (ii) one or more prior property listings, (iii) one or more prior prospective buyers, and/or (iv) one or more prior indications of interest. Additionally or alternatively to the foregoing system, wherein (i) the one or more sellers may include one or more of (a) one or more seller identifiers, (b) one or more list of previously sold properties, (c) one or more lists of prior property listings, and/or (d) one or more property categorizations the seller intends to categorize property listings; (ii) the one or more prior property listings may include one or more of (a) one or more property titles, (b) one or more property categorizations, (c) one or more property search tags, and/or (d) one or more property descriptions; (iii) the one or more prior prospective buyers may include one or more of (a) one or more prospective buyer identifiers, (b) one or more lists of prior properties purchased, (c) one or more indications of categorizations of interest, (d) one or more property wish lists, (e) one or more lists of saved properties for later purchase, and/or (f) one or more indications of an intent to purchase within a time period; (iv) the one or more prior indications of interest may include one or more of (a) one or more search terms, (b) one or more selected property categorizations, (c) one or more selected property search tags, (d) one or more selected property parameters, and/or (e) one or more selected property descriptions.

Additionally or alternatively to the foregoing system, training the machine learning model may further cause the system to: generate a set of training pairings of the one or more sellers and the one or more prospective buyers; generate a training pair confidence score for each training pairing in the set of training pairings based upon the set of training data; determine the prior prospective buyers in each training purchased an property associated with the one or more prior property listings from a paired seller; reduce the percent rate of error of determining the prior prospective buyers in each training purchased a property associated with the one or more prior property listings from the paired seller by calculating one or more of: (i) the ordinary least squares of the difference between the training pairing with the training pair confidence score with a greatest value and the one or more prospective buyers that actually purchased a property associated with the one or more prior property listings from the paired seller, or (ii) the ordinary mean square of an aggregation of a resulting output between the training pairing with the training pair confidence score with a greatest value and the one or more prospective buyers that actually purchased a property associated with the one or more prior property listings from the paired seller; and/or generate a confidence interval based upon one or more of: (i) the one or more prospective buyers with the training pair confidence score with the greatest value, (ii) the one or more prospective buyers that actually purchased a property associated with the one or more prior property listings from the paired seller, and/or (iii) one or more standard deviations from the resulting output.

Additionally or alternatively to the foregoing system, analyzing the one or more parameters of the one or more properties and the one or more indications of interest may further cause the system to: generate the pair confidence score based upon (i) the one or more parameters of the property, (ii) the one or more indications of interest, (iii) the set of training data, (iv) the one or more prospective buyers, and (v) the one or more sellers.

Additionally or alternatively to the foregoing system, the instructions may further cause the system to: determine that the one or more prospective buyers with the recommendation score with the greatest value purchased the property and/or sellers with the recommendation score with the greatest value sold the property; and/or update, the set of training data by adding the one or more prospective buyers with the recommendation score with the greatest value, the one or more sellers with the recommendation score with the greatest value, the determination of the one or more prospective buyers with the recommendation score with the greatest value purchasing the property, and/or the determination of the one or more sellers with the recommendation score with the greatest value selling the property to the set of training data.

In another aspect, a tangible, a non-transitory computer-readable medium may store executable instructions for automated paring of sellers and prospective buyers may be provided. The executable instructions, when executed, may cause one or more processors to: (1) train a machine learning model using a set of training data related to previously paired prospective buyers and sellers; (2) receive one or more property listings (i) representative of one or more properties possessed by and/or offered for sale by one or more sellers via transaction and (ii) potentially including one or more parameters of the one or more properties; (3) access one or more indications of interest associated with one or more prospective buyers, the one or more indications of interest potentially including one or more characteristics of one or more properties for potential acquisition by the one or more prospective buyers; (4) generate a set of pairings of the one or more sellers and the one or more prospective buyers; (5) analyze, using the machine learning model, the one or more parameters of the one or more properties and the one or more indications of interest to generate, for each pairing of the set of pairings, a pair confidence score; and/or (6) communicate, to one or more electronic devices associated with at least one of (i) the one or more sellers or (ii) the one or more prospective buyers, information indicative of at least a portion of the set of pairings based upon the pair confidence score. The instructions may direct additional, less, or alternate functionality, including that discussed elsewhere herein.

For instance, additionally or alternatively the foregoing executable instructions, the set of training data may include one or more of (i) one or more sellers, (ii) one or more prior property listings, (iii) one or more prior prospective buyers, and/or (iv) one or more prior indications of interest. Additionally or alternatively to the foregoing executable instructions, wherein (i) the one or more sellers may include one or more of (a) one or more seller identifiers, (b) one or more list of previously sold properties, (c) one or more lists of prior property listings, and/or (d) one or more property categorizations the seller intends to categorize property listings; (ii) the one or more prior property listings may include one or more of (a) one or more property titles, (b) one or more property categorizations, (c) one or more property search tags, and/or (d) one or more property descriptions; (iii) the one or more prior prospective buyers may include one or more of (a) one or more prospective buyer identifiers, (b) one or more lists of prior properties purchased, (c) one or more indications of categorizations of interest, (d) one or more property wish lists, (e) one or more lists of saved properties for later purchase, and/or (f) one or more indications of an intent to purchase within a time period; (iv) the one or more prior indications of interest may include one or more of (a) one or more search terms, (b) one or more selected property categorizations, (c) one or more selected property search tags, (d) one or more selected property parameters, and/or (e) one or more selected property descriptions.

Additionally or alternatively to the foregoing executable instructions, training the machine learning model may further cause the one or more processors to: generate a set of training pairings of the one or more sellers and the one or more prospective buyers; generate a training pair confidence score for each training pairing in the set of training pairings based upon the set of training data; determine the prior prospective buyers in each training purchased an property associated with the one or more prior property listings from a paired seller; reduce the percent rate of error of determining the prior prospective buyers in each training purchased an property associated with the one or more prior property listings from the paired seller by calculating one or more of: (i) the ordinary least squares of the difference between the training pairing with the training pair confidence score with a greatest value and the one or more prospective buyers that actually purchased a property associated with the one or more prior property listings from the paired seller, or (ii) the ordinary mean square of an aggregation of a resulting output between the training pairing with the training pair confidence score with a greatest value and the one or more prospective buyers that actually purchased a property associated with the one or more prior property listings from the paired seller; and/or generate a confidence interval based upon one or more of: (i) the one or more prospective buyers with the training pair confidence score with the greatest value, (ii) the one or more prospective buyers that actually purchased a property associated with the one or more prior property listings from the paired seller, and/or (iii) one or more standard deviations from the resulting output.

Additionally or alternatively to the foregoing system, analyzing the one or more parameters of the one or more properties and the one or more indications of interest may further cause the one or more processors to: generate the pair confidence score based upon (i) the one or more parameters of the property, (ii) the one or more indications of interest, (iii) the set of training data, (iv) the one or more prospective buyers, and (v) the one or more sellers.

Additionally or alternatively to the foregoing executable instructions, the executable instructions may further cause the one or more processors to: determine that the one or more prospective buyers with the recommendation score with the greatest value purchased the property and/or sellers with the recommendation score with the greatest value sold the property; and/or update, the set of training data by adding the one or more prospective buyers with the recommendation score with the greatest value, the one or more sellers with the recommendation score with the greatest value, the determination of the one or more prospective buyers with the recommendation score with the greatest value purchasing the property, and/or the determination of the one or more sellers with the recommendation score with the greatest value selling the property to the set of training data.

Additional Exemplary Embodiments: Predictive Models and Systems

In some embodiments, the prospective buyer and/or seller recommendation system and/or the prospective buyer and seller pairing system may operate automatically without a request from a prospective buyer and/or seller. For example, the prospective buyer and/or seller recommendation system and/or the prospective buyer and seller pairing system may operate periodically (e.g., quarterly, every six months, etc.) and/or by a triggered event (e.g., the creation of a new prospective buyer profile, the creation of a new seller profile, the posting of a new property listing, etc.).

Additionally and/or alternatively, in some embodiments, the prospective buyer and/or seller recommendation system and/or the prospective buyer and seller pairing system may operate even if there is no property listing. In these embodiments, the prospective buyer and/or seller recommendation system and/or the prospective buyer and seller pairing system may make a determination as to the likelihood a seller might sell a particular item and/or real property. For example, the prospective buyer and/or seller recommendation system and/or the prospective buyer and seller pairing system may make the determination based upon certain factors related to the seller (e.g., category the seller typically sells, release date of an upcoming product, length of time the seller has owned and/or possessed a piece of real estate, browsing history, etc.).

Similarly, the prospective buyer and/or seller recommendation system and/or the prospective buyer and seller pairing system may make a similar determination as to the likelihood a prospective buyer might purchase a specific (and/or type of) item and/or real estate. For example, the prospective buyer and/or seller recommendation system and/or the prospective buyer and seller pairing system may make the determination based upon certain factors related to the prospective buyer (e.g., indications of interest, browsing history, etc.).

Additionally and/or alternatively, in some embodiments, the prospective buyer and/or seller recommendation system and/or the prospective buyer and seller pairing system may make a determination as to the most appropriate method of communication for communicating with the prospective buyer that might purchase a specific item and/or real estate and/or the seller that might sell a specific item and/or real estate.

For example, if the prospective buyer and/or seller recommendation system and/or the prospective buyer and seller pairing system determines that a seller might be willing to sell a piece of real estate they own, the prospective buyer and/or seller recommendation system and/or the prospective buyer and seller pairing system may then analyze all form of communication to reach that seller as well as the likelihood that seller will accept and/or respond to unsolicited communications (e.g., the seller always answers their phone, sometimes responds to email, but never responds to direct messages on social media). In addition, the prospective buyer and/or seller recommendation system and/or the prospective buyer and seller pairing system may even develop a communication profile of the seller and/or prospective buyer based on demographics of other, similar, successfully contacted sellers and/or prospective buyers to determine a best communication message that can persuade the seller and/or buyer to respond and/or engage with the one or more marketplaces.

Additionally and/or alternatively, in some embodiments, the prospective buyer and/or seller recommendation system and/or the prospective buyer and seller pairing system may use various algorithms and/or predictive models to determine whether a listing is still active and/or up to date and/or will soon be inactive even if a transaction has not occurred on the one or more online marketplaces. For example, if a threshold period of time has passed since a listing has been generated (either by one of the above systems or by a seller) the prospective buyer and/or seller recommendation system and/or the prospective buyer and seller pairing system may deem the listing as inactive and either hide the listing and/or remove the listing from the online marketplace. As another example, the prospective buyer and/or seller recommendation system and/or the prospective buyer and seller pairing system may determine based on a plethora of factors (e.g., length of time since the listing went live, frequency of the seller accessing the online marketplace, number of interactions the seller has had with prospective buyers on the online marketplace, frequency over a period of time the listing has been accessed by one or more prospective buyers, historical data of any of the foregoing, etc.) the prospective buyer and/or seller recommendation system and/or the prospective buyer and seller pairing system may predict when the listing will no longer become active and then deem the listing as inactive once that predicted time has passed. Once the listing has been deemed as inactive, the prospective buyer and/or seller recommendation system and/or the prospective buyer and seller pairing system may alert the seller and inquire whether the seller has already sold the item in the listing and/or still intends to sell the item in the listing if they have not yet sold it already.

Similarly, the prospective buyer and/or seller recommendation system and/or the prospective buyer and seller pairing system may use various algorithms and/or predictive models to determine whether a prospective buyer is still actively searching for an item to buy. For example, if a threshold period of time has passed since a prospective buyer has generated an indication of interest one or more items, the prospective buyer and/or seller recommendation system and/or the prospective buyer and seller pairing system may deem the prospective buyer as no longer actively looking for the one or more items and may hide the prospective buyer from the one or more sellers and/or remove the prospective buyer from consideration in generating a buyer recommendation and/or a buyer and seller pairing. As another example, the prospective buyer and/or seller recommendation system and/or the prospective buyer and seller pairing system may determine based on a plethora of factors (e.g., length of time since the prospective buyer generated an indication of interest in the one or more items, frequency of the prospective buyer accessing the online marketplace, number of interactions the prospective buyer has had with sellers on the online marketplace, frequency over a period of time listings have been accessed by prospective buyer, historical data of any of the foregoing, etc.) the prospective buyer and/or seller recommendation system and/or the prospective buyer and seller pairing system may predict when the prospective buyer will no longer be actively looking for the one or more items and then deem the prospective buyer as no longer actively looking for the one or more items once that predicted time has passed. Once the prospective buyer has been deemed as no longer actively looking for the one or more items, the prospective buyer and/or seller recommendation system and/or the prospective buyer and seller pairing system may alert the prospective buyer and inquire whether the prospective buyer has already purchased the one or more items and/or still intends to buy the one or more items if they have not yet bought them already.

Additionally and/or alternatively, in some embodiments, the prospective buyer and seller pairing system may operate by performing separate recommendations for prospective buyers and sellers. For example, the prospective buyer and seller pairing system may first make a recommendation of a prospective buyer for each seller and then the prospective buyer and seller pairing system may make a second recommendation of a seller for each prospective buyer. As another example, the prospective buyer and seller pairing system may first make a recommendation of a seller for each prospective buyer and then the prospective buyer and seller pairing system may make a second recommendation of a prospective buyer for each seller. In either example, the prospective buyer and seller pairing system may then make a pairing determination based on the relative resulting recommendations (e.g., as described above).

In one aspect, a computer-implemented method for determining one or more potential sellers may be provided. The method may be implemented via one or more local and/or remote processors, transceivers, sensors, servers, memory units, mobile devices, wearables, smart glasses, augmented reality glasses, virtual reality headsets, and/or other electronic and/or electrical components. In one instance, the method may include: (1) training, by one or more processors, a machine learning model using a set of training data related to previously determined sellers; (2) receiving, by the one or more processors, a buyer request from a prospective buyer, the buyer request (i) may be representative of one or more properties possessed by a potential seller, (ii) may include one or more parameters of the one or more properties, and/or (iii) may include one or more indications of interest in buying the one or more properties, the one or more indications of interest in buying the one or more properties may include one or more characteristics of one or more properties for potential acquisition by the one or more prospective buyers; (3) accessing, by the one or more processors, one or more databases of one or more potential sellers, the one or more databases may include (i) the one or more properties possessed by the one or more potential sellers that have one or more parameters of the buyer request and/or (ii) one or more indications of interest in selling the one or more properties from one or more potential sellers; (4) analyzing, by the one or more processors using the machine learning model, the buyer request and/or the one or more databases of potential sellers to determine, for each potential seller, a prediction score on the potential seller's likelihood to sell the one or more properties; (5) determining, by the one or more processors, whether the potential seller is willing to sell the one or more properties to the buyer based upon the prediction score; and/or (6) communicating, by the one or more processors to an electronic device, information indicative of the determination of whether the potential seller is willing to sell the one or more properties. The method may include additional, less, or alternate actions, including those discussed elsewhere herein.

In another aspect, a computer system for automated paring of sellers and prospective buyers may be provided. The computer system may be configured to include one or more local and/or remote processors, transceivers, sensors, servers, memory units, mobile devices, wearables, smart glasses, augmented reality glasses, virtual reality headsets, and/or other electronic and/or electrical components. In one instance, the computer system may include one or more processors; and/or a non-transitory program memory coupled to the one or more processors and/or storing executable instructions that, when executed by the one or more processors, cause the computer system to: (1) train a machine learning model using a set of training data related to previously determined sellers; (2) receive a buyer request from a prospective buyer, the buyer request (i) may be representative of one or more properties possessed by a potential seller, (ii) may include one or more parameters of the one or more properties, and/or (iii) may include one or more indications of interest in buying the one or more properties, the one or more indications of interest in buying the one or more properties may include one or more characteristics of one or more properties for potential acquisition by the one or more prospective buyers; (3) access one or more databases of one or more potential sellers, the one or more databases may include (i) the one or more properties possessed by the one or more potential sellers that have one or more parameters of the buyer request and/or (ii) one or more indications of interest in selling the one or more properties from one or more potential sellers; (4) analyze, using the machine learning model, the buyer request and/or the one or more databases of potential sellers to determine, for each potential seller, a prediction score on the potential seller's likelihood to sell the one or more properties; (5) determine whether the potential seller is willing to sell the one or more properties to the buyer based upon the prediction score; and/or (6) communicate, to an electronic device, information indicative of the determination of whether the potential seller is willing to sell the one or more properties. The computer system may be configured to include additional, less, or alternate functionality, including that discussed elsewhere herein.

In another aspect, a tangible, a non-transitory computer-readable medium may store executable instructions for automated paring of sellers and prospective buyers may be provided. The executable instructions, when executed, may cause one or more processors to: (1) train a machine learning model using a set of training data related to previously determined sellers; (2) receive a buyer request from a prospective buyer, the buyer request (i) may be representative of one or more properties possessed by a potential seller, (ii) may include one or more parameters of the one or more properties, and/or (iii) may include one or more indications of interest in buying the one or more properties, the one or more indications of interest in buying the one or more properties may include one or more characteristics of one or more properties for potential acquisition by the one or more prospective buyers; (3) access one or more databases of one or more potential sellers, the one or more databases may include (i) the one or more properties possessed by the one or more potential sellers that have one or more parameters of the buyer request and/or (ii) one or more indications of interest in selling the one or more properties from one or more potential sellers; (4) analyze, using the machine learning model, the buyer request and/or the one or more databases of potential sellers to determine, for each potential seller, a prediction score on the potential seller's likelihood to sell the one or more properties; (5) determine whether the potential seller is willing to sell the one or more properties to the buyer based upon the prediction score; and/or (6) communicate, to an electronic device, information indicative of the determination of whether the potential seller is willing to sell the one or more properties. The instructions may direct additional, less, or alternate functionality, including that discussed elsewhere herein.

Additional Considerations

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, some embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules may provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may, at a later time, access the memory device to retrieve and process the stored output. Modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Unless specifically stated otherwise, discussions herein using words such as "receiving," "analyzing," "generating," "creating," "storing," "deploying," "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other.

As used herein any reference to "some embodiments" means that a particular element, feature, structure, or characteristic described in connection with the embodiment may be included in at least one embodiment. The appearances of the phrase "some embodiments" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for the systems and methods disclosed herein.

Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed:

1. A computer-implemented method for recommending prospective buyers of property to sellers, comprising:

training, by one or more processors, a machine learning model using a set of training data related to previously recommended prospective buyers;

receiving, by the one or more processors, a property listing, the property listing (i) representative of a property possessed by a seller and (ii) including one or more parameters of the property;

accessing, by the one or more processors, one or more indications of interest associated with one or more prospective buyers, the one or more indications of interest including one or more characteristics of one or more properties for potential acquisition by the one or more prospective buyers;

analyzing, by the one or more processors using the machine learning model, the one or more parameters of the property and the one or more indications of interest to generate, for each prospective buyer of the one or more prospective buyers, a recommendation score;

determining, by the one or more processors for each form of communication of a plurality of forms of communication, a likelihood that the seller will respond to that form of communication; and based on the determined likelihoods that the seller will respond corresponding to the plurality of forms of communication, transmitting, by the one or more processors to an electronic device associated with the seller via a form of communication of the plurality of forms of communication, information indicative of at least a portion of the one or more recommendation scores for the one or more prospective buyers.

2. The computer-implemented method of claim 1, wherein the set of training data includes:

(i) one or more prior property listings, the one or more prior property listings including one or more of (a) one or more property titles, (b) one or more property categorizations, (c) one or more property search tags, or (d) one or more property descriptions;

(ii) one or more prior prospective buyers, the one or more prior prospective buyers including one or more of (a) one or more prospective buyer identifiers, (b) one or more lists of prior properties purchased, (c) one or more indications of property categorizations of interest, (d) one or more property wish lists, (e) one or more lists of saved properties for later purchase, or (f) one or more indications of an intent to purchase within a time period; and (iii) one or more prior indications of interest, the one or more prior indications of interest including one or more of (a) one or more search terms, (b) one or more selected property categorizations, (c) one or more selected property search tags, (d) one or more selected property parameters, or (e) one or more selected property descriptions.

3. The computer-implemented method of claim 2, wherein training the machine learning model comprises:

generating, by the one or more processors, a training recommendation score for each of the one or more prior prospective buyers based upon a set of previously recommended prior prospective buyers and the set of training data; and determining, by the one or more processors, each of the previously recommended prior prospective buyers purchased a property associated with the one or more prior property listings.

4. The computer-implemented method of claim 3, wherein training the machine learning model comprises:

reducing, by the one or more processors, a percent rate of error of determining each of the previously recommended prior prospective buyers that purchased a property associated with the one or more prior property listings by calculating one or more of: (i) an ordinary least squares of a difference between the one or more prospective buyers with the training recommendation score with a greatest value and the one or more prospective buyers that purchased a property associated with the one or more prior property listings, or (ii) an ordinary mean square of an aggregation of a resulting output between the one or more prospective buyers with the training recommendation score with the greatest value and the one or more prospective buyers that purchased a property associated with the one or more prior property listings; and generating, by the one or more processors, a confidence interval based upon one or more of: (i) the one or more prospective buyers with the training recommendation score with the greatest value, (ii) the one or more prospective buyers that actually purchased a property associated with the one or more prior property listings, and/or (iii) one or more standard deviations from the resulting output.

5. The computer-implemented method of claim 1, wherein analyzing the one or more parameters of the property and the one or more indications of interest comprises:

generating, by the one or more processors, the recommendation score based upon (i) the one or more parameters of the property, (ii) the one or more indications of interest, (iii) the set of training data, and (iv) the one or more prospective buyers.

6. The computer-implemented method of claim 5, further comprising:

determining, by the one or more processors, that the one or more prospective buyers with the recommendation score with the greatest value purchased the property; and updating, by the one or more processors, the set of training data by adding the one or more prospective buyers with the recommendation score with the greatest value and the determination of the one or more prospective buyers with the recommendation score with the greatest value purchasing the property to the set of training data.

7. A computer-implemented method for determining potential sellers of property comprising:

training, by one or more processors, a machine learning model using a set of training data related to previously determined sellers;

receiving, by the one or more processors, a buyer request from a prospective buyer, the buyer request (i) representative of one or more properties possessed by a potential seller, (ii) including one or more parameters of the one or more properties, and (iii) including one or more indications of interest in buying the one or more properties, the one or more indications of interest in buying the one or more properties including one or more characteristics of one or more properties for potential acquisition by the one or more prospective buyers;

accessing, by the one or more processors, one or more databases of one or more potential sellers, the one or more databases including (i) the one or more properties possessed by the one or more potential sellers that have one or more parameters of the buyer request and (ii) one or more indications of interest in selling the one or more properties from one or more potential sellers;

analyzing, by the one or more processors using the machine learning model, the buyer request and the one or more databases of potential sellers to determine, for each potential seller, a prediction score on the potential seller's likelihood to sell the one or more properties;

determining, by the one or more processors, whether the potential seller is willing to sell the one or more properties to the buyer based upon the prediction score;

determining, by the one or more processors for each form of communication of a plurality of forms of communication, a likelihood that the seller will respond to that form of communication; and based on the determined likelihoods that the seller will respond corresponding to the plurality of forms of communication, transmitting, by the one or more processors to an electronic device via a form of communication of the plurality of forms of communication, information indicative of the determination of whether the potential seller is willing to sell the one or more properties.

8. A computer system for recommending prospective buyers of properties to sellers, comprising:

one or more processors;

a non-transitory program memory coupled to the one or more processors and storing executable instructions that, when executed by the one or more processors, cause the computer system to:

train a machine learning model using a set of training data related to previously recommended prospective buyers;

receive a property listing (i) representative of a property possessed by a seller and (ii) including one or more parameters of the property;

access one or more indications of interest associated with one or more prospective buyers, the one or more indications of interest including one or more characteristics of one or more properties for potential acquisition by the one or more prospective buyers;

analyze, using the machine learning model, the one or more parameters of the property and the one or more indications of interest to generate, for each prospective buyer of the one or more prospective buyers, a recommendation score;

determine, by the one or more processors for each form of communication of a plurality of forms of communication, a likelihood that the seller will respond to that form of communication; and based on the determined likelihoods that the seller will respond corresponding to the plurality of forms of communication, transmit, to an electronic device associated with the seller via a form of communication of the plurality of forms of communication, information indicative of at least a portion of the one or more recommendation scores for the one or more prospective buyers.

9. The computer system of claim 8, wherein the set of training data includes one or more of (i) one or more prior property listings, (ii) one or more prior prospective buyers, or (iii) one or more prior indications of interest.

10. The computer system of claim 9, wherein:

(i) the one or more prior property listings includes one or more of (a) one or more property titles, (b) one or more property categorizations, (c) one or more property search tags, or (d) one or more property descriptions;

(ii) the one or more prior prospective buyers includes one or more of (a) one or more prospective buyer identifiers, (b) one or more lists of prior properties purchased, (c) one or more indications of property categorizations of interest, (d) one or more property wish lists, (e) one or more lists of saved properties for later purchase, or (f) one or more indications of an intent to purchase within a time period; and (iii) the one or more prior indications of interest include one or more of (a) one or more search terms, (b) one or more selected property categorizations, (c) one or more selected property search tags, (d) one or more selected property parameters, or (e) one or more selected property descriptions.

11. The computer system of claim 10 wherein to train the machine learning model, the executable instructions, when executed by the one or more processors, cause the computer system to:

generate a training recommendation score for each of the one or more prior prospective buyers based upon a set of previously recommended prior prospective buyers and the set of training data; and determine each of the previously recommended prior prospective buyers purchased a property associated with the one or more prior property listings.

12. The computer system of claim 11, wherein to train the machine learning model, the executable instructions, when executed by the one or more processors, cause the computer system to:

reduce a percent rate of error of determining each of the previously recommended prior prospective buyers that purchased a property associated with the one or more prior property listings by calculating one or more of: (i) an ordinary least squares of a difference between the one or more prospective buyers with the training recommendation score with a greatest value and the one or more prospective buyers that purchased a property associated with the one or more prior property listings, or (ii) an ordinary mean square of an aggregation of a resulting output between the one or more prospective buyers with the training recommendation score with the greatest value and the one or more prospective buyers that purchased a property associated with the one or more prior property listings; and generate a confidence interval based upon one or more of: (i) the one or more prospective buyers with the training recommendation score with the greatest value, (ii) the one or more prospective buyers that actually purchased a property associated with the one or more prior property listings, and/or (iii) one or more standard deviations from the resulting output.

13. The computer system of claim 12, wherein to analyze the one or more parameters of the property and the one or more indications of interest, the executable instructions, when executed by the one or more processors, cause the computer system to:

generate the recommendation score based upon (i) the one or more parameters of the property, (ii) the one or more indications of interest, (iii) the set of training data, and (iv) the one or more prospective buyers.

14. The computer system of claim 13, wherein the executable instructions, when executed by the one or more processors, further cause the computer system to:

determine that the one or more prospective buyers with the recommendation score with the greatest value purchased the property; and update the set of training data by adding the one or more prospective buyers with the recommendation score with the greatest value and the determination of the one or more prospective buyers with the recommendation score with the greatest value purchasing the property to the set of training data.

15. A computer-implemented method for automated pairing of prospective buyers and sellers, comprising:

training, by one or more processors, a machine learning model using a set of training data related to previously paired prospective buyers and sellers;

receiving, by the one or more processors, one or more property listings (i) representative of one or more properties possessed one or more sellers and (ii) including one or more parameters of the one or more properties;

accessing, by the one or more processors, one or more indications of interest associated with one or more prospective buyers, the one or more indications of interest including one or more characteristics of one or more properties for potential acquisition by the one or more prospective buyers;

generating, by the one or more processors, a set of pairings of the one or more sellers and the one or more prospective buyers;

analyzing, by the one or more processors using the machine learning model, the one or more parameters of the one or more properties and the one or more indications of interest to generate, for each pairing of the set of pairings, a pair confidence score;

determining, by the one or more processors for each form of communication of a plurality of forms of communication, a likelihood that a seller of the one or more sellers will respond to that form of communication; and based on the determined likelihoods that the seller of the one or more sellers will respond corresponding to the plurality of forms of communication, transmitting, by the one or more processors to an electronic device of one or more electronic devices associated with at least one seller of the one or more sellers, information indicative of at least a portion of the set of pairings based upon the pair confidence score.

16. The computer-implemented method of claim 15, wherein the set of training data includes one or more of (i) one or more prior sellers, (ii) one or more prior property listings, (iii) one or more prior prospective buyers, or (iv) one or more prior indications of interest.

17. The computer-implemented method of claim 16, wherein:

(i) the one or more prior sellers includes one or more of (a) one or more seller identifiers, (b) one or more list of previously sold properties, (c) one or more lists of prior property listings, or (d) one or more property categorizations the seller intends to categorize property listings;

(ii) the one or more prior property listings includes one or more of (a) one or more property titles, (b) one or more property categorizations, (c) one or more property search tags, or (d) one or more property descriptions;

(iii) the one or more prior prospective buyers includes one or more of (a) one or more prospective buyer identifiers, (b) one or more lists of prior properties purchased, (c) one or more indications of property categorizations of interest, (d) one or more property wish lists, (e) one or more properties of saved properties for later purchase, or (f) one or more indications of an intent to purchase within a time period; and (iv) the one or more prior indications of interest include one or more of (a) one or more search terms, (b) one or more selected property categorizations, (c) one or more selected property search tags, (d) one or more selected property parameters, or (e) one or more selected property descriptions.

18. The computer-implemented method of claim 17, wherein training the machine learning model comprises:

generating, by the one or more processors, a set of training pairings of the one or more sellers and the one or more prospective buyers;

generating, by the one or more processors, a training pair confidence score for each training pairing in the set of training pairings based upon the set of training data; and determining, by the one or more processors, the prior prospective buyers in each training purchased a property associated with the one or more prior property listings from a paired seller.

19. The computer-implemented method of claim 18, wherein training the machine learning model comprises:

reducing, by the one or more processors, the percent rate of error of determining the prior prospective buyers in each training purchased a property associated with the one or more prior property listings from the paired seller by calculating one or more of: (i) the ordinary least squares of the difference between the training pairing with the training pair confidence score with a greatest value and the one or more prospective buyers that actually purchased a property associated with the one or more prior property listings from the paired seller, or (ii) the ordinary mean square of an aggregation of a resulting output between the training pairing with the training pair confidence score with a greatest value and the one or more prospective buyers that actually purchased a property associated with the one or more prior property listings from the paired seller; and generating, by the one or more processors, a confidence interval based upon one or more of: (i) the one or more prospective buyers with the training pair confidence score with the greatest value, (ii) the one or more prospective buyers that actually purchased a property associated with the one or more prior property listings from the paired seller, and/or (iii) one or more standard deviations from the resulting output.

20. The computer-implemented method of claim 19, wherein analyzing the one or more parameters of the one or more properties and the one or more indications of interest comprises:

generating, by the one or more processors, the pair confidence score based upon (i) the one or more parameters of the property, (ii) the one or more indications of interest, (iii) the set of training data, (iv) the one or more prospective buyers, and (v) the one or more sellers.

* * * * *